United States Patent
Yamamoto

(10) Patent No.: US 8,213,823 B2
(45) Date of Patent: Jul. 3, 2012

(54) HIGH-VOLTAGE POWER SUPPLY DEVICE AND IMAGE FORMING APPARATUS INCLUDING THE SAME

(75) Inventor: Tetsuya Yamamoto, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 12/643,451

(22) Filed: Dec. 21, 2009

(65) Prior Publication Data

US 2010/0166463 A1 Jul. 1, 2010

(30) Foreign Application Priority Data

Dec. 26, 2008 (JP) ................. 2008-333865
Nov. 11, 2009 (JP) ................. 2009-258191

(51) Int. Cl.
*G03G 15/00* (2006.01)
*H01L 41/08* (2006.01)

(52) U.S. Cl. ......................... 399/88; 310/318

(58) Field of Classification Search .............. 399/37, 399/50, 55, 66, 88, 89, 314; 310/318; 361/225; 323/355; 363/16, 39, 40, 41; 315/55, 209 PZ
See application file for complete search history.

(56) References Cited

U.S. PATENT DOCUMENTS

| | | | | | |
|---|---|---|---|---|---|
| 5,705,877 | A | * | 1/1998 | Shimada | 310/318 |
| 5,739,679 | A | * | 4/1998 | Takehara et al. | 323/299 |
| 6,013,969 | A | * | 1/2000 | Noma et al. | 310/318 |
| 6,016,052 | A | * | 1/2000 | Vaughn | 323/355 |
| 6,198,198 | B1 | * | 3/2001 | Fujimura et al. | 310/316.01 |
| 7,023,142 | B2 | * | 4/2006 | Chou et al. | 315/209 PZ |
| 7,548,708 | B2 | * | 6/2009 | Nagasaki et al. | 399/88 |
| 7,558,501 | B2 | * | 7/2009 | Saito et al. | 399/88 |
| 7,898,149 | B2 | * | 3/2011 | Yasukawa | 310/318 |
| 7,973,520 | B2 | * | 7/2011 | Kondo | 323/247 |
| 2011/0188878 | A1 | * | 8/2011 | Watanabe et al. | 399/88 |
| 2011/0293311 | A1 | * | 12/2011 | Nemoto | 399/88 |

FOREIGN PATENT DOCUMENTS

| | | |
|---|---|---|
| JP | 11-206113 A | 7/1999 |
| JP | 2005198462 A * | 7/2005 |
| JP | 2007189880 A * | 7/2007 |

* cited by examiner

*Primary Examiner* — Robert Beatty
(74) *Attorney, Agent, or Firm* — Canon U.S.A., Inc. IP Division

(57) ABSTRACT

In a power supply that outputs a high voltage by driving a piezoelectric element, a switching-on time period of a switching element in an initial frequency range when the piezoelectric element starts to be driven is set to a smaller value.

20 Claims, 22 Drawing Sheets

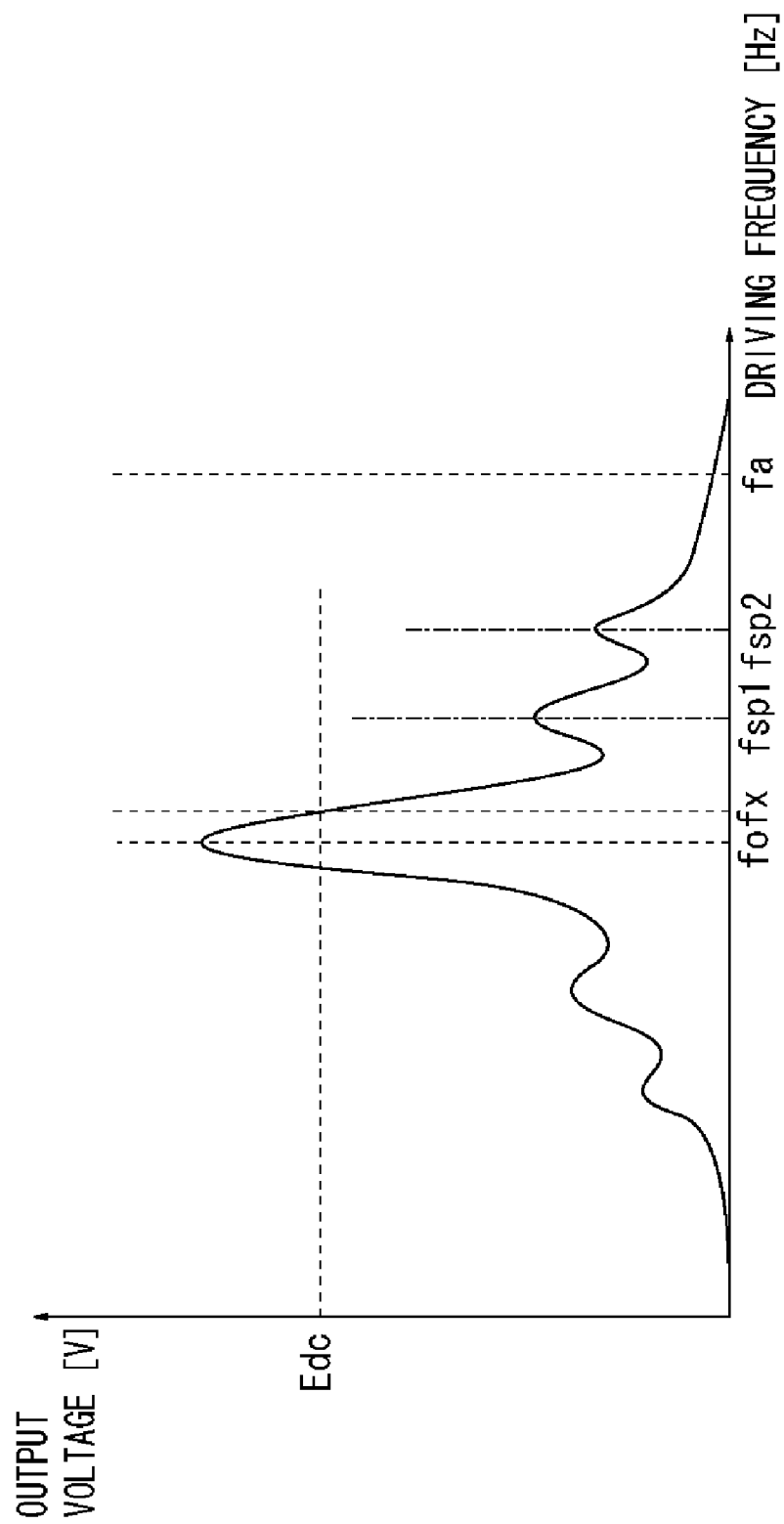

HIGH-VOLTAGE POWER SUPPLY DEVICE AND IMAGE FORMING APPARATUS INCLUDING THE SAME

BACKGROUND OF THE INVENTION

1. Field of the Invention

The present invention relates to a power supply device that outputs a high voltage using a piezoelectric transformer, and an image forming apparatus including the power supply device.

2. Description of the Related Art

In recent years, a color laser printer or a copying machine of an electrophotographic system as an image forming apparatus includes a plurality of photosensitive drums serving as an image bearing member, a plurality of charging rollers for charging respective photosensitive drums, and exposure devices for exposing respective charged photosensitive drums and causing latent images to be formed on each of the plurality of photosensitive drums. In addition, the color laser printer, and the copying machine include a development device for developing the formed latent images using a toner serving as a developer, and a transfer roller for transferring images developed on the photosensitive drums on recording paper.

A voltage (also referred to as a charging bias) for charging the image bearing member is applied to the charging roller described above, a voltage (also referred to as a developing bias) for developing the toner is applied to the development device, and a voltage (also referred to as a transfer bias) for transferring an image on a recording paper is applied to the transfer roller.

As respective voltages used for these image forming operations, high voltages are used. For example, in order to achieve a good transfer, the transfer bias used is about 3 kV at maximum. An image forming apparatus includes a plurality of power supply devices for high-voltage output.

For generating a high voltage for an image forming operation, as a power supply device for such a high-voltage output, conventionally a wire-wound electromagnetic transformer has been used. The electromagnetic transformer is composed of a copper wire, a bobbin, and a magnetic core, and if it is used for the image forming apparatus, a leakage current from the electromagnetic transformer when outputting the high-voltage is to be minimized.

For this purpose, such a configuration that a winding of the electromagnetic transformer be insulated by a mold or the like is used. Further, since the number of the windings increases according to an electric power (voltage) to be supplied, a size of the electromagnetic transformer becomes larger when a higher voltage is output. Therefore, further reductions in size and weight of the power supply device could not be easily realized.

Thus, in order to further achieve reductions in size and weight of the power supply device, a power supply device, which generates a high voltage using a thin, light-weight, high-voltage output piezoelectric element (piezoelectric transformer) is discussed, for example, in Japanese Patent Application Laid-Open No. 11-206113. More specifically, by constructing a piezoelectric transformer using a thin and light-weight piezoelectric element made of a ceramic as raw material, it becomes possible to generate a high voltage at a higher efficiency than that of the electromagnetic transformer.

Since it becomes possible to keep a distance between the electrodes on the primary and secondary sides of the power supply device by using the piezoelectric transformer, executing special molding work for the purpose of insulation like the electromagnetic transformer may be eliminated. Therefore, if the piezoelectric transformer is used, the reductions of size and weight of the power supply device can be realized. The power supply device, which outputs a high voltage using the piezoelectric transformer, can be applied to various apparatuses that use high voltages, without being limited to such an image forming apparatus as described above.

An example of a circuit of a high-voltage power supply device for high-voltage output using the piezoelectric transformer (hereinafter, also referred to as a piezoelectric transformer type high-voltage power supply device) will be described referring to FIG. 17. A circuit example illustrated in FIG. 17 is, as an example, a charging bias output circuit for outputting a negative bias.

In FIG. 17, the circuit includes a piezoelectric transformer 101Y of a high-voltage power supply. The output of the piezoelectric transformer 101Y is rectified and smoothened to a negative voltage by diodes 102Y, 103Y and a high-voltage capacitor 104Y, and supplied from an output terminal 116Y to a charging roller (i.e., a load, not illustrated).

The output voltage is divided by resistors 105Y, 106Y, and 107Y, and input to a non-inverting input terminal (+terminal) of an operational amplifier 109Y via a protective resistor 108Y. To an inverting input terminal (−terminal) of the operational amplifier 109Y, a control signal (Vcont signal) for the high-voltage power supply, which is an analog signal, is input from a controller (i.e., control unit, not illustrated) via a connection terminal 118Y and a resistor 114Y.

By constituting an integrating circuit by the operational amplifier 109Y, the resistor 114Y, and a capacitor 113Y, a control signal (Vcont signal) smoothened according to an integration time constant determined by the values of the resistor and the capacitor is input to the operational amplifier 109Y. An output terminal of the operational amplifier 109Y is connected to a voltage-controlled oscillator (VCO) 110Y, and the output terminal is connected to a field effect transistor (FET) 111Y connected to an inductor-capacitor (LC) parallel resonance circuit formed by the inductor 112Y and the capacitor 115Y.

The voltage-controlled oscillator (VCO) 110Y outputs a driving signal for switching the FET 111Y. The FET 111Y is switched according to the driving signal. The voltage-controlled oscillator (VCO) 110Y is used to perform such an operation as to raise an output frequency when the input voltage rises, and to reduce the output frequency when the input voltage falls.

Therefore, a frequency depending on an input level thereof is output from the voltage-controlled oscillator (VCO) 110Y. The output signal of the voltage-controlled oscillator (VCO) 110Y drives the inductor-capacitor (LC) resonance circuit, and thereby finally a power supply depending on the control signal (Vcont signal) is supplied to the primary side of the piezoelectric transformer 101Y.

FIG. 18 illustrates a characteristic of an output voltage with respect to a driving frequency of the piezoelectric transformer 101Y. As illustrated in FIG. 18, a characteristic of the piezoelectric transformer is that an output voltage generally peaks at a resonance frequency f0, and it can be seen that a control of the output voltage based on a driving frequency is possible.

Let fx represent a driving frequency when a target output-voltage Edc is output. The voltage-controlled oscillator (VCO) 110Y operates such that the driving frequency varies according to the control signal (Vcont signal). In order to control the output voltage Edc to a higher voltage, the piezoelectric transformer is driven at a driving frequency lower than fx. On the other hand, in order to control the output voltage Edc to a lower voltage, the piezoelectric transformer is driven at a driving frequency far higher than fx.

In other words, an example of the high-voltage driving circuit illustrated in FIG. 17 is a negative feedback control circuit, in which the output voltage is controlled to be a constant-voltage so that the output voltage becomes equal to a voltage determined by the voltage of the control signal (Vcont) input to an inverting input terminal (−terminal) of the operational amplifier 109Y.

As for a circuit control operation, a sweep operation is performed from an initial frequency of a certain high-frequency band to start driving of the piezoelectric transformer, toward fx in a lower frequency direction, until an output coincides with the target voltage value, i.e., Edc value by a feedback circuit. As a result of the sweep operation, upon converging to the frequency fx, the circuit becomes an equilibrium state, and the output voltage Edc will be stably output.

However, there is the following situation in the above-described piezoelectric transformer type high-voltage power supply device. In the circuit configuration illustrated in FIG. 17, a driving signal 300 illustrated in FIG. 19 is input to the gate of the switching element 111Y to drive the inductor-capacitor (LC) resonance circuit. As a result, a signal in a flyback waveform as illustrated in a signal 301 is input to a piezoelectric element.

It is known that undesired resonance frequencies (hereinafter, referred to as spurious frequencies) indicated by fsp1, fsp2, fsp3, fsp4 in FIG. 18 appear by applying an electrical oscillation on the piezoelectric element in a square-shaped waveform different from such a sinusoidal wave. The spurious frequency is dependent on the structure of the piezoelectric transformer such as a width and a thickness.

FIG. 20 illustrates an input waveform of the piezoelectric transformer generated by the LC resonance circuit when a switching operation is performed at a frequency in the neighborhood of the spurious frequency fsp1. FIG. 20 includes, similar to FIG. 19, a gate signal 300 of the switching FET, and a drain voltage 301 of the switching FET, i.e., an input voltage waveform of the piezoelectric transformer. In addition, FIG. 20 includes a drain current 302 of the switching FET.

As illustrated as the drain voltage 301 in FIG. 20, distortions are produced in the voltage waveform by resonance at the spurious frequencies of the piezoelectric transformer separate from resonance frequency determined by values of L and C. As a result, at timing when the drain voltage of the switching FET is not "0", the gate is turned on. Thereby, as illustrated in the waveform 302, an excessive drain current will eventually flow.

As for a circuit operation as described above, the sweep operation is performed from an initial frequency to start driving of the piezoelectric transformer, to a lower side of frequencies so as to reach a predetermined voltage value. Therefore, at the time of starting, the sweep operation causes the frequencies to pass through the spurious frequencies. Each time, at the time of the starting, an excessive current transiently flows in the switching FET, as illustrated in FIG. 20.

In other words, elements that can withstand such an excessive current as the switching FET are selected, and thus users cannot select more inexpensive elements as the switching FET.

In order not to generate the transient excessive current, it is conceivable to set a control range of the output voltage of the piezoelectric transformer to a frequency range in which there is no influence of the spurious frequencies (in the range lower than a frequency corresponding to a voltage Edc' of FIG. 18). However, since this makes a voltage control range narrow, it cannot be an adequate measure. For example, when a much lower voltage is used, the output voltage will be subjected to the influence of spurious frequencies.

SUMMARY OF THE INVENTION

According to an aspect of the present invention, a device includes a piezoelectric element, a switching unit configured to drive the piezoelectric element, and an oscillation unit configured to output a frequency signal to the switching unit, configured to output a high voltage by driving the piezoelectric element at a frequency based on the frequency signal. The device further includes a control unit configured to output a control signal for controlling the oscillation unit to output the frequency signal, and a setting unit configured to set a switching-on time period of a switching element driven by the frequency signal, wherein the setting unit is configured to, in a frequency range from an initial frequency at which drive of the piezoelectric element is started to a driving frequency at which a target voltage is output from the piezoelectric element, set the switching-on time period in a frequency range including an interval during which a spurious resonance frequency is generated from the initial frequency, shorter than the switching-on time period when the piezoelectric element is driven at the driving frequency.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a frequency characteristic of a piezoelectric transformer.

DESCRIPTION OF THE EMBODIMENTS

Various exemplary embodiments, features, and aspects of the invention will be described in detail below with reference to the drawings. It should be noted that exemplary embodiments as will be described below are merely examples, and are not to be construed as limiting a technical range of the present invention only to the arrangements of these embodiments.

Figure 1:
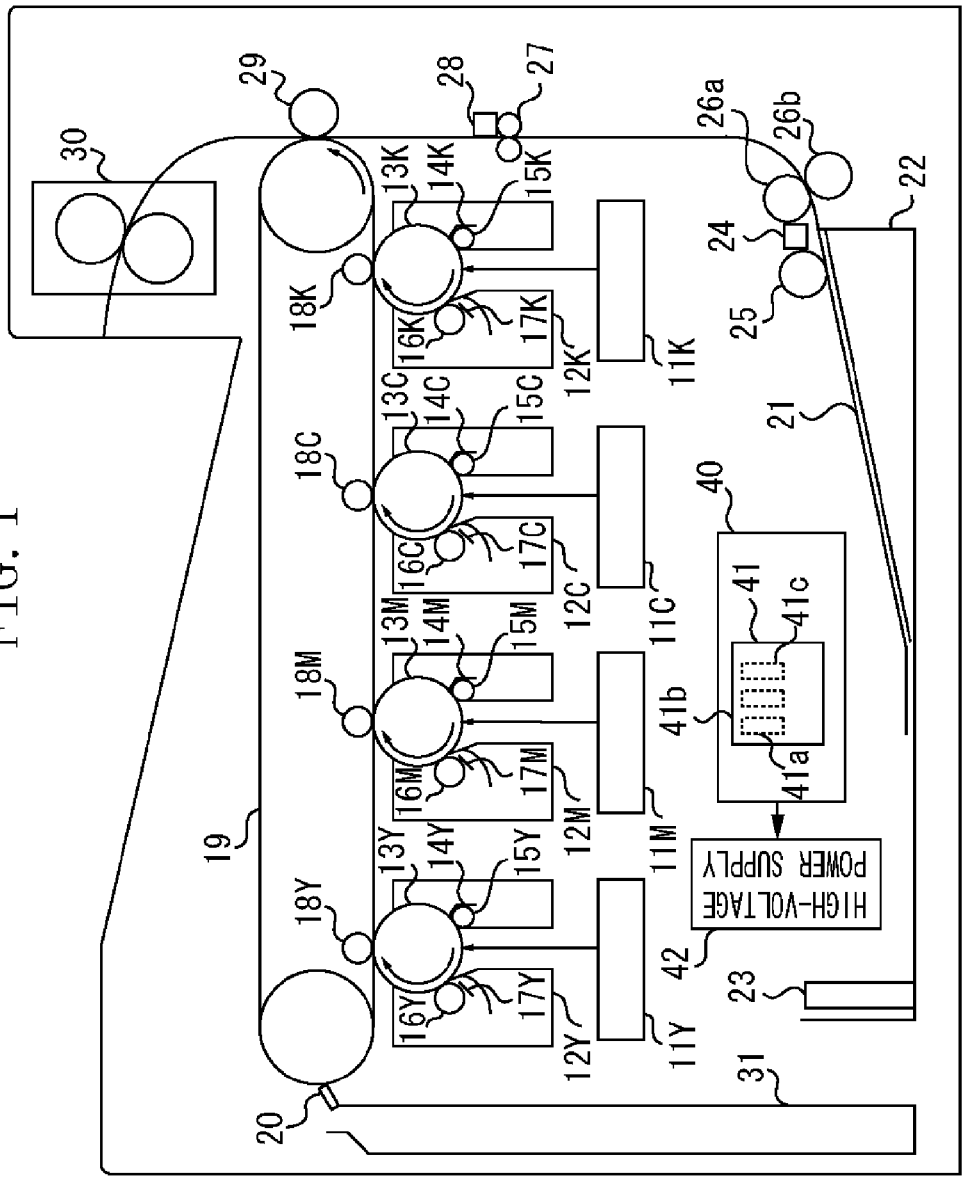
FIG. 1 is a sectional view illustrating an image forming apparatus.

Hereinbelow, a first exemplary embodiment will be described. First, an example of an image forming apparatus according to the present invention will be described based referring to FIG. 1. FIG. 1 is a configuration diagram of a color laser printer, which is an example of the image forming apparatus using an electrophotographic process. A configuration of the image forming apparatus will be described with reference to FIG. 1.

The image forming apparatus (color laser printer) is provided with an image forming unit, which outputs full-color images by superposing four-color toners of yellow (Y), magenta (M), cyan (C), and black (K). As a configuration of image forming units for respective colors, laser scanners (11Y, 11M, 11C, 11K) and cartridges (12Y, 12M, 12C, 12K) are provided.

The cartridges (12Y, 12M, 12C, 12K) include photosensitive members (13Y, 13M, 13C, 13K) that rotate in an arrow direction in FIG. 1 as image bearing members, charging rollers (15Y, 15M, 15C, 15K) that charge photosensitive members, developing rollers (16Y, 16M, 16C, 16K) that develop latent images formed on the photosensitive members using toners as developers, development devices having blades (17Y, 17M, 17C, 17K), and cleaners (14Y, 14M, 14C, 14K) for removing the developers remained on the photosensitive members by bringing the cleaners into contact with the photosensitive members.

Further, an intermediate transfer belt (intermediate transfer member) 19 is provided in contact with the photosensitive members (13Y, 13M, 13C, 13K) for respective colors. Then, primary transfer rollers (18Y, 18M, 18C, 18K) are arranged to face the photosensitive members (13Y, 13M, 13C, 13K) on the opposite side thereof with respect to the intermediate transfer belt 19.

Further, a belt cleaner 20 is provided on the intermediate transfer belt 19, and a container 31 in which the toner scraped off by the belt cleaner 20 is to be stored is also included. Further, a cassette 22 for storing a sheet 21 is included in the image forming apparatus. The cassette 22 includes a guide 23 for regulating the position of the sheet 21 placed in the cassette 22, and a sheet presence/absence sensor 24 for detecting presence/absence of the sheet 21 in the cassette 22.

In a conveyance path for the sheet 21, a sheet feeding roller 25, separation rollers 26a, 26b, and a roller 27 are provided, and a sensor 28 is provided near the conveyance path of the downstream side of sheet conveyance direction of the roller 27. The roller 27 has a function for stopping temporarily the conveyance of the sheet for the purpose of synchronizing a conveyed sheet and an image on the intermediate transfer belt 19. A secondary transfer roller 29 is arranged in contact with the intermediate transfer belt 19, and a fixing device 30 at the downstream of the secondary transfer roller 29 along the conveyance path.

Further, the color laser printer includes a controller 40 (i.e., control unit) for controlling an operation of the color laser printer, and the controller 40 includes a micro-processing unit (MPU) 41 including a random-access memory (RAM) 41a, a read-only memory (ROM) 41b, a timer 41c, and various input and output control circuits (not illustrated).

Further, a high-voltage power supply 42 includes a high-voltage power supply for charging-voltage output (not illustrated), a high-voltage power supply for developing-voltage output (not illustrated) corresponding to respective cartridges, and a high-voltage power supply for transfer-voltage output (not illustrated) that can output a high-voltage to respective temporary transfer rollers, and the secondary transfer roller, which are controlled by the controller 40.

Next, an image forming operation will be briefly described. The surfaces of the photosensitive members (13Y, 13M, 13C, 13K) of the cartridges (12Y, 12M, 12C, 12K) are uniformly charged by the charging rollers (15Y, 15M, 15C, 15K). Next, laser beams modulated according to image data are irradiated on surfaces of the photosensitive members (13Y, 13M, 13C, 13K) by the laser scanners (11Y, 11M, 11C, 11K), and electrostatic latent images are formed on the surfaces of the photosensitive members (13Y, 13M, 13C, 13K).

In the development device, layers of the toners (i.e., developers) are formed by the blades (17Y, 17M, 17C, 17K) on the developing rollers (16Y, 16M, 16C, 16K). The toners are adhered from the developing rollers to the electrostatic latent images on the photosensitive members by the developing bias, thus forming the toner images of respective colors on the surfaces of the photosensitive members (13Y, 13M, 13C, 13K).

The toner images formed on the surfaces of the photosensitive members are attracted to the intermediate transfer belt 19 by the transfer bias at a nip portion formed between the photosensitive member and the intermediate transfer belt 19. Moreover, an image forming timing in respective cartridges (12Y, 12M, 12C, 12K) is controlled at timing according to a conveyance speed of the intermediate transfer belt 19, and the respective toner images are sequentially transferred on the intermediate transfer belt 19, thereby finally forming a full-color image on the intermediate transfer belt 19.

On the other hand, the sheet 21 in the cassette 22 is conveyed by the sheet feeding roller 25, and is separated one by one by the separation roller pairs 26a, 26b. Then, the sheet 21 passes through a registration roller 27 and conveyed to the secondary transfer roller 29.

The toner image on the intermediate transfer belt 19 is transferred onto the sheet 21 at the nip portion formed between the secondary transfer roller 29 located at the downstream of the roller 27 and the intermediate transfer belt 19.

After that, the toner image of the sheet 21 is heated and pressurized by the fixing device 30 to undergo fixing process, and discharged outside the image forming apparatus.

Figure 2:
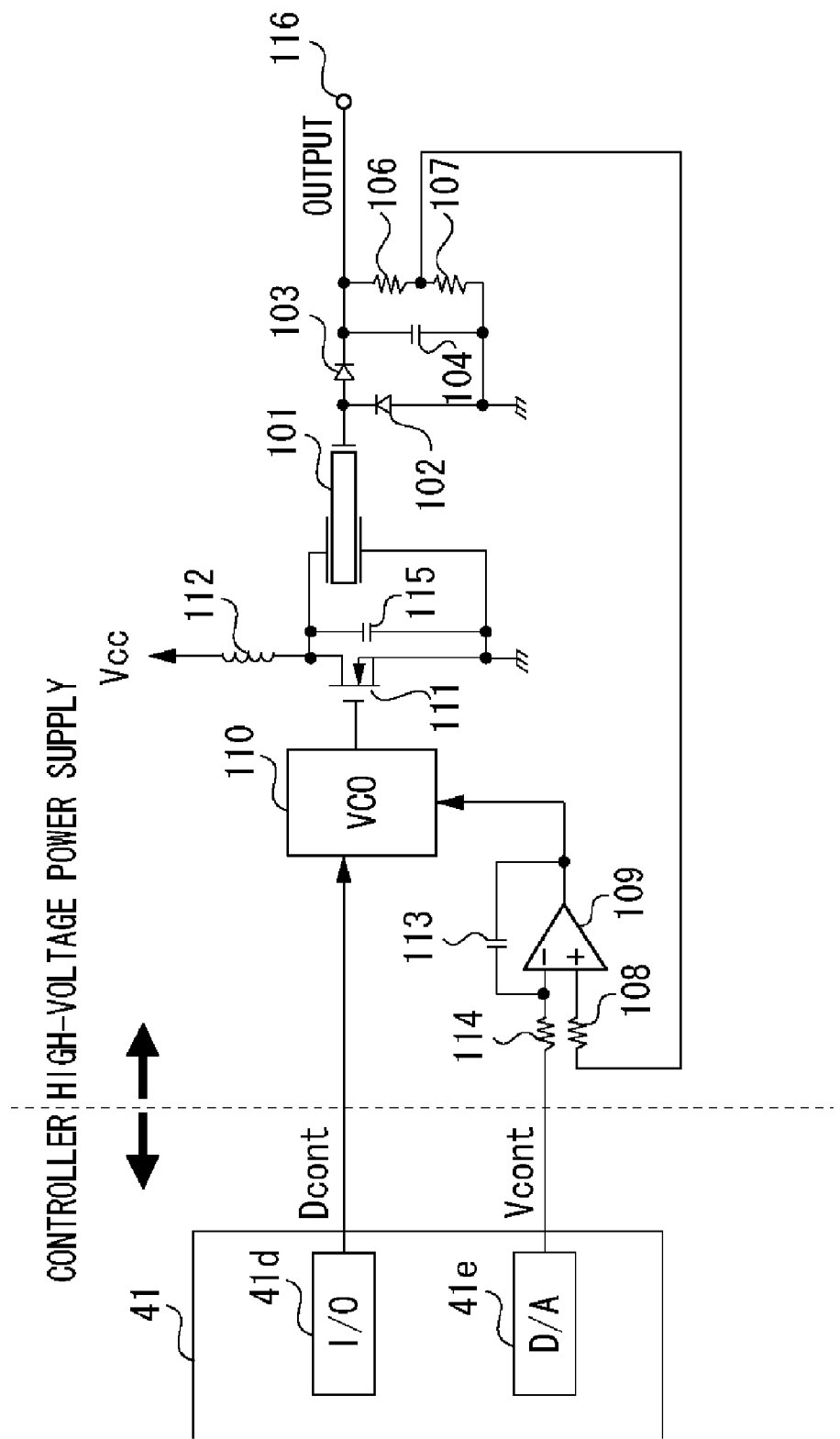
FIG. 2 is a circuit configuration diagram illustrating a high-voltage power supply and a control unit according to a first exemplary embodiment.
Figure 3:
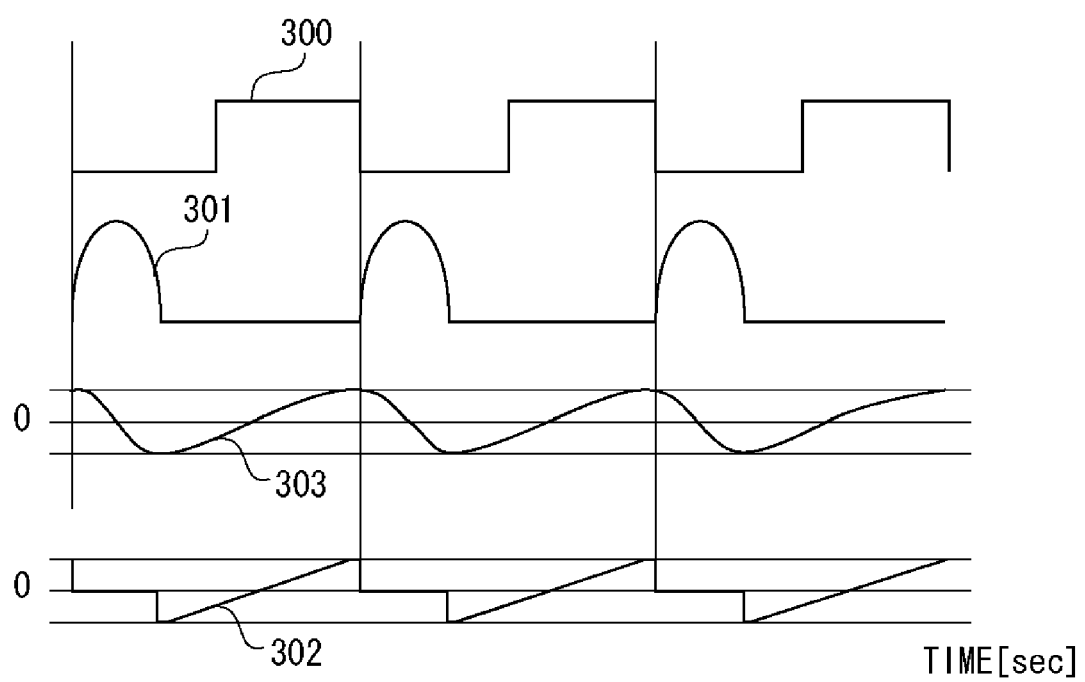
FIG. 3 is a voltage current waveform diagram illustrating a circuit operation according to the first exemplary embodiment.

Next, an operation of a power supply device for high-voltage output (hereinafter, referred to as a high-voltage power supply device) using the piezoelectric transformer will be described with reference to FIG. 2 and FIG. 3 according to the present exemplary embodiment. A circuit illustrated in FIG. 2 is an example circuit of the power supply device for outputting positive voltages, which is applicable, for example, as a power supply device for transfer voltage output. The power supply device is not limited to the circuit for outputting the positive voltage, but it is applicable to a circuit for outputting the negative voltages as well.

An output of the piezoelectric transformer 101 is rectified and smoothened to a positive voltage by diodes 102 and 103, and a high-voltage capacitor 104, and a high-voltage is output as direct-current voltage to an output terminal 116. On the other hand, the output voltage is divided by resistors 106 and 107, to be input to a non-inverting input terminal (+terminal) of an operational amplifier 109 via a protective resistor 108.

On the other hand, an inverting-input terminal (−terminal) of the operational amplifier 109 is connected to a digital analog conversion port (hereinafter, described as D/A port) 41e of the MPU 41 in the controller 40 via a resistor 114.

A control signal (Vcont) of the high-voltage power supply (analog signal) is output from the D/A port 41e, to be input to an integrating circuit. The integrating circuit is composed of the operational amplifier 109 and the resistor 114 and the capacitor 113. The control signal (Vcont) smoothened with an integration time constant determined by part-values of the resistor and the capacitor is input to the operational amplifier 109.

The output terminal of the operational amplifier 109 is connected to the voltage-controlled oscillator (VCO) 110. The output terminal of the voltage-controlled oscillator (VCO) 110 is connected to an FET 111 connected to an LC parallel resonance circuit formed by an inductor 112 and a capacitor 115. The voltage-controlled oscillator (VCO) 110 performs such an operation, according to an input-voltage from the operational amplifier 109, as to raise an output frequency when the input voltage rises, and to reduce the output frequency when the input voltage falls.

In other words, the MPU 41 functions as a control signal output unit for outputting a driving signal from the voltage-controlled oscillator (VCO) 110. Further, the voltage-controlled oscillator (VCO) 110 is connected to an output port 41d of the MPU 41 on the controller 40, and an output setting signal (hereinafter, referred to as a Dcont signal) from the 41d is a signal for performing a switching operation of the duty of the output signal (hereinafter, referred to as a duty) according thereto.

More specifically, in a case of Dcont=High Level, 30% duty signal is output, and in a case of Dcont=Low Level, 50% duty signal is output. In the present exemplary embodiment, an example of switching between two types of duty outputs, i.e., 50% and 30% is described, but without being limited thereto, it is also possible to switch among three types or more of duty outputs.

Duty means a time width of ON signal of a gate signal of the FET 111 as will be described below. As described above, the microcomputer 41 functions as a setting unit for setting a duty of a driving signal from the voltage-controlled oscillator (VCO) 110.

A driving signal as an output signal from the voltage-controlled oscillator (VCO) 110 performs the switching of a switching element 111 (hereinafter, referred to as an FET 111). As a result, the LC resonance circuit is driven, and electrical oscillation is applied to the primary side of the piezoelectric transformer 101. Then, an AC waveform with a high-voltage is output to the secondary side of the piezoelectric transformer 101. As a result, a voltage according to the Vcont is finally output to the output terminal 116.

Now, an operation of the primary side drive unit of the piezoelectric transformer 101 will be described in more detail with reference to FIG. 3. FIG. 3 illustrates a voltage waveform 300 applied to the gate of the FET 111, a voltage waveform 301, which appears in a drain of the FET 111, a current 303, which flows in the inductor 112, and a drain current 302, which flows in the FET 111.

When the FET 111 is turned on, current flows in the inductor 112, and thus the energy is stored in the inductor 112. Next, when the FET 111 is turned off, resonance is generated between the inductor 112 and the capacitor 115, as indicated by the waveform 301. The resonance is successively repeated with good efficiency by driving the FET 111 so that the ON time period of the FET 111 starts when the resonance voltage is 0V.

On the other hand, a waveform of a current that flows in the inductor 112 during the resonating operation is represented by a waveform 302 (similar to the drain current of the FET 111). When the FET 111 is turned on, the current flows in the FET 111 through the inductor 112. Then, after the FET 111 is turned off, the current continues to flow so as to charge the capacitor 115 by the inductive action of the inductor 112.

Further, after the current that flows in the inductor 112 becomes 0V and the voltage that appears at the drain of the FET 111 peaks, a current regenerating operation begins instead. As a result, current flows to the side of the power supply Vcc from the capacitor 115 and from a regenerative diode (not illustrated) in the FET 111. Thus, a voltage boosted sufficiently by the above-described resonating operation is applied to the piezoelectric transformer 101, oscillation is generated, and a high-voltage is generated on the secondary side.

Next, a circuit operation when a predetermined voltage Edc is output will be described referring to FIG. 4. The Vcont signal is input to the voltage-controlled oscillator (VCO) 110, and it is configured so that when a voltage value of the Vcont signal is 0 V, an output of frequency signal of the voltage-controlled oscillator (VCO) 110 is stopped.

The voltage Edc is potential-divided by resistors 106, 107. The MPU outputs an analog voltage equivalent to the divided voltage as Vcont signal. The voltage-controlled oscillator (VCO) 110 starts to drive the piezoelectric transformer from an initial frequency fa when the Vcont signal rises from 0 V and reaches a voltage equal to or greater than a predetermined voltage.

A driving frequency range of the VCO 110 is set in advance to a frequency range including f0, and a sweep operation is performed from fa to a frequency fx corresponding to the voltage Edc by a feedback circuit described in FIG. 2.

As described in the conventional example, there exist undesired resonance frequencies (spurious frequencies) fsp1, fsp2 generated depending on width and thickness of a piezoelectric element. For example, in order to resolve this situation, a switching element (FET) that can withstand an excessive current is selected. However, the cost of such an element (FET) is high. The color laser printer described above includes 10 or more power supply circuits for high-voltage output. Accordingly, the application of an inexpensive element as the switching element would contribute to a further cost reduction of the device.

Figure 21:
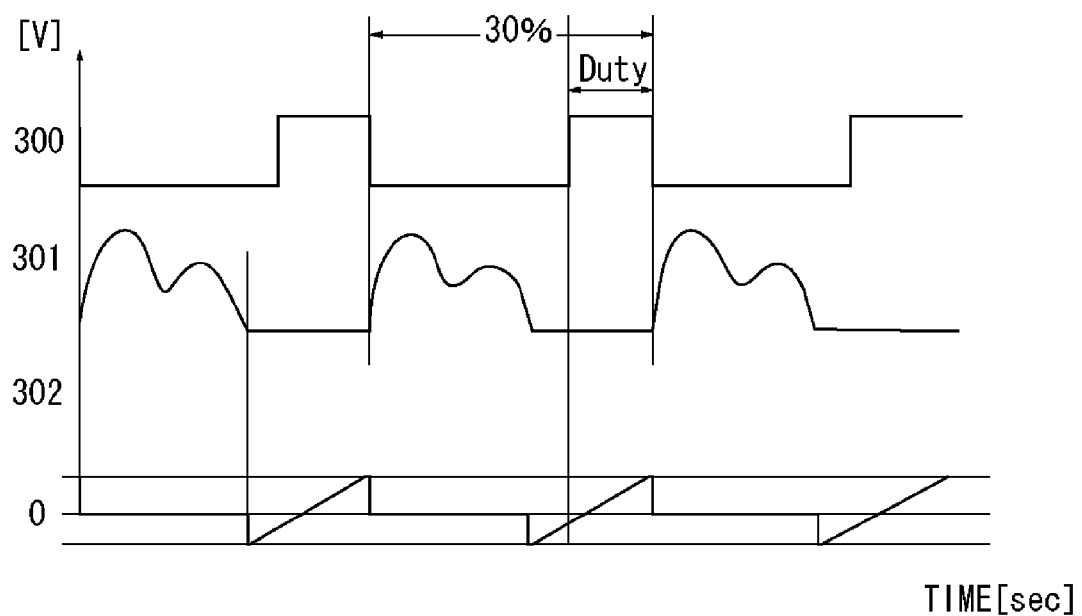
FIG. 21 is an example of a voltage current waveform diagram when a piezoelectric transformer is driven.

Further, as another measure for spurious frequencies, a duty of the driving frequency may be changed to a small duty as illustrated in FIG. 21. In FIG. 21, a waveform 300 indicates a gate signal of the FET, a waveform 301 indicates a drain voltage of the FET, and a waveform 302 indicates a drain current of the FET (similar to FIG. 21). When the duty is made to be 30% like the gate signal in FIG. 21, an excessive drain current generated due to the waveform distorted caused by the spurious frequencies can be prevented from flowing.

Figure 22:
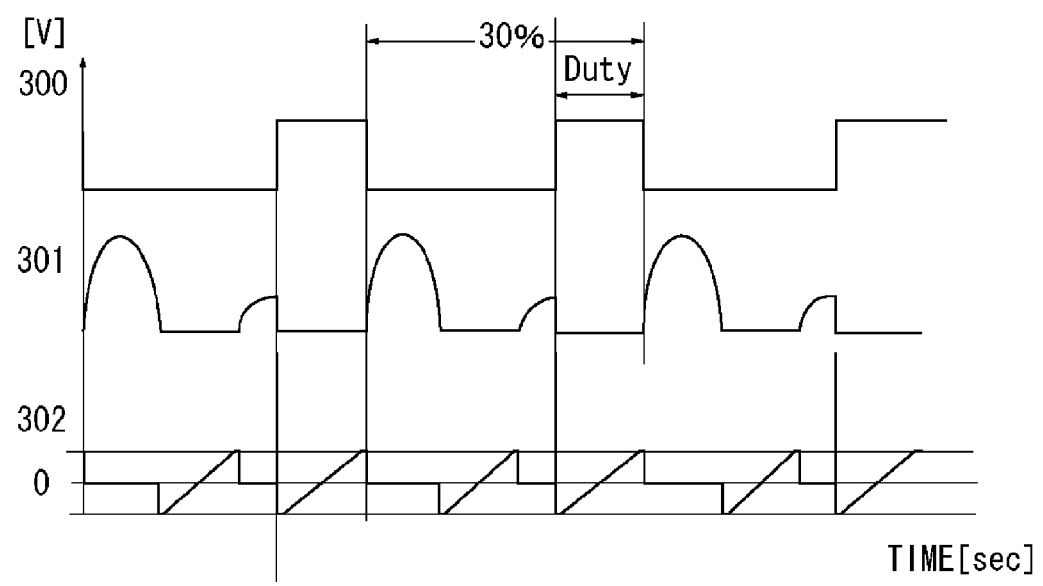
FIG. 22 is an example of a voltage current waveform diagram when a piezoelectric transformer is driven.

However, when the driving frequency becomes low, while the duty remains to be 30%, a secondary resonance oscillation waveform appears as illustrated in FIG. 22. If the duty is simply made to be low, an excessive current will be similarly generated when a high voltage is output. To resolve this situation, an FET that can withstand the excessive current generated similarly to the above description may be used.

However, in the above-described color laser printer, since a plurality of power supply circuits for high-voltage output are mounted as described above. Accordingly, if expensive FETs are used for all circuits, the cost will increase.

In the present exemplary embodiment, the use of the FET as an inexpensive switching element makes it possible to reduce an influence of voltage fluctuations due to the spurious frequencies. The characteristic operation is an operation for making the driving frequency have a low duty in a high-frequency range (high-frequency region) from the initial frequency to the spurious frequency, and for making the driving frequency have a high duty in a lower frequency range (low frequency region) than the spurious frequencies.

As a result, it becomes possible to prevent the generation of excessive drain current in the FET as a switching element described in the conventional example. In other words, a characteristic control in the present exemplary embodiment lies in a switching of the duty outputs after the lapse of a predetermined time from the start of the operation, in the time of the starting operation of the high-voltage power supply by the sweeping the frequency.

Hereinafter, the control will be described with reference to the rising waveforms illustrated in FIGS. 5A and 5B, and the flowchart illustrated in FIG. 6. A starting waveform of the output voltage illustrated in FIG. 5A will be described, comparing with an output characteristic diagram illustrated in FIG. 5B.

First, when the piezoelectric transformer starts to be driven at the initial frequency fa, an output of high voltage becomes V1. A driving frequency is shifted to a lower frequency side by the feedback circuit and the voltage-controlled oscillator (VCO), and the spurious frequencies fsp2, and fsp1 are passed in order.

Figures 5A, 5B:
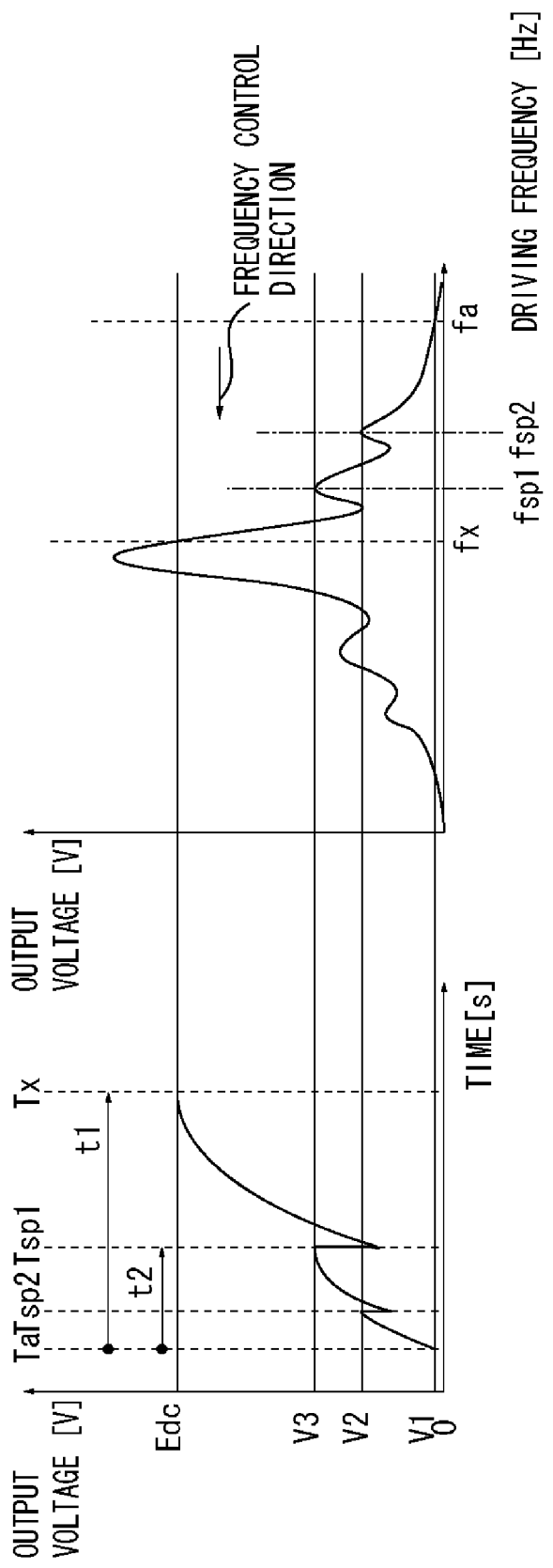
FIGS. 5A and 5B illustrate a starting operation of a piezoelectric transformer according to the first exemplary embodiment.
Figure 6:
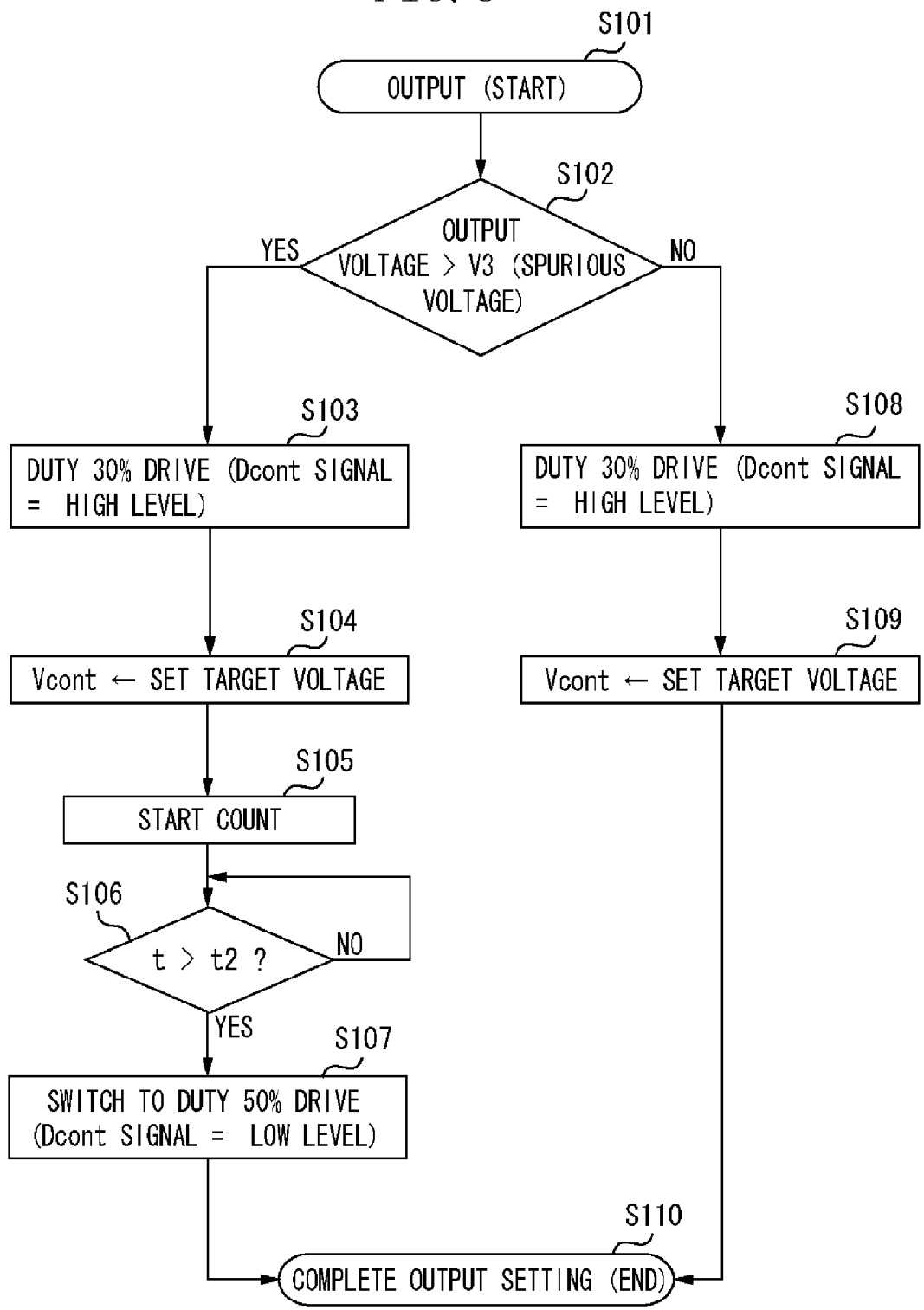
FIG. 6 is a flowchart illustrating a control operation according to the first exemplary embodiment.

The timings when passing through these spurious frequencies are Tsp2, and Tsp1 in FIG. 5A, respectively, which yield a stepwise rising waveform by the influence of the spurious voltages V2 and V3. Further, the circuit continues to sweep the frequency to obtain the output-voltage Edc, and finally at the driving frequency fx, the output-voltage Edc is obtained after t1 seconds.

This rising time t1 and a time t2 when the driving frequency passes through the spurious frequencies are determined depending on a capacitance value of the capacitor 104, a resistance value of the detection resistor 106, and a load connected to the output terminal. For example, when the present exemplary embodiment is applied to the color laser beam printer as the image forming apparatus described above, it is applied to power supply circuits for supplying high voltages to the charging roller, the developing roller, and the transfer roller respectively.

These members each have different loads, and change over time (deteriorate) along with the use of the image forming apparatus. Therefore, appropriate rising time for each member is determined in advance. Moreover, since there is a possibility that the rising time may fluctuate depending on environmental conditions (temperature, humidity), it is determined in advance considering the factors of change of temperature and humidity.

It is possible to set time t2 and time t1 counted from a point when the piezoelectric transformer starts to be driven by a firmware, which executes a program described below. Thus, in the present exemplary embodiment, a high-voltage starting control is performed, in which the sweep operation is started at 30% duty when the piezoelectric transformer starts to be driven, and then switched to 50% duty from t2.

A control of the present exemplary embodiment will be described with reference to the flowchart in FIG. 6. A control processing illustrated in the flowchart in FIG. 6 is executed by the MPU 41 according to a program stored in advance in the ROM 41b.

First, in step S101, the firmware receives a request for output of a high voltage. Then, in step S102, the firmware determines whether a voltage is higher than a spurious voltage V3 (highest spurious voltage). The V3 has a certain amount of variation depending on variation of the piezoelectric elements. The V3 in consideration of the variation of elements in terms of control is to be determined.

In step S102, if the firmware determines that a voltage to be output is not greater than the spurious voltage (NO in step S102), the process proceeds to step S108. In step S108, the controller 40 sets the Dcont signal to High Level so as to fix the duty at 30%. In step S109, the controller 40 outputs a D/A value corresponding to a target voltage to the Vcont signal.

The control circuit starts the sweep operation from the timing when the D/A value is output in step S109. When a low output voltage is output in the piezoelectric transformer control circuit, the piezoelectric transformer will be driven at a high-frequency region. At this time, the secondary waveform of the LC resonance frequency as illustrated in FIG. 22 will not appear.

On the other hand, the possibility that the piezoelectric transformer is controlled near the spurious frequencies becomes high. As a result, an excessive drain current does not flow in the switching FET by causing the piezoelectric transformer to be driven at a low duty (30%) regardless of the driving frequency. The steps performed in consideration of this fact are steps S108, and S109.

On the other hand, if the firmware determines that a voltage to be output is equal to or greater than the spurious voltage (YES in step S102), then in steps S103 and S104, the controller 40 starts to drive the piezoelectric transformer at duty 30%. In addition, in step S105, the controller 40 causes a counter to start. Then in step S106, the controller 40 waits for the lapse of t2 seconds.

As described referring to FIGS. 5A and 5B, the spurious frequencies have been passed in a process of the sweep operation at the stage when t2 seconds has elapsed. Subsequently, in step S107, the VCO 110 switches to 50% duty drive of the piezoelectric transformer. Then in step S110, the VCO 110 completes an output setting of the high voltage.

Figure 7A:
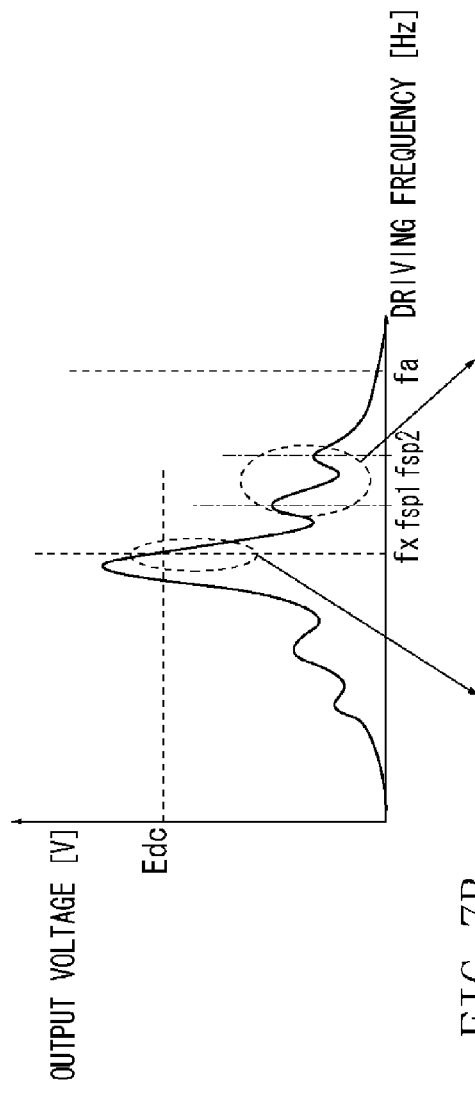
FIGS. 7A to 7C are voltage current waveform diagrams of a circuit operation when a control is executed according to the first exemplary embodiment.
Figure 7C:
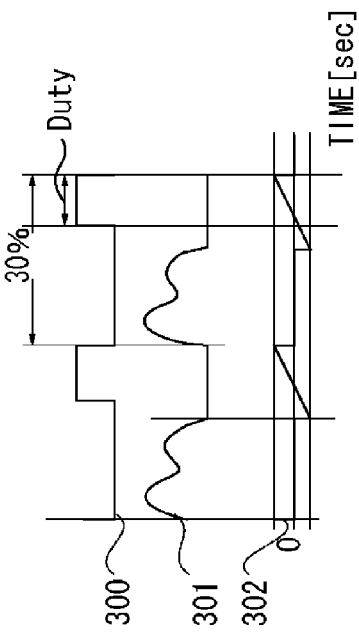
Figure 7B:
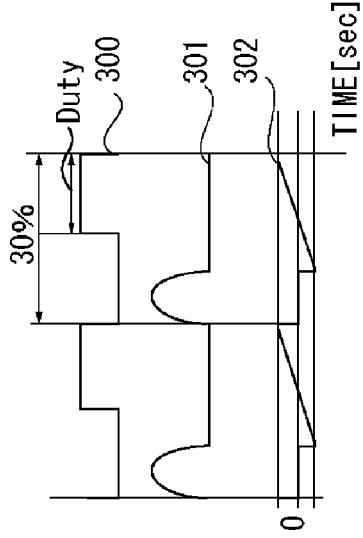

The driving waveforms at respective frequencies when the operation is performed according to the flowchart described above, are as illustrated in FIGS. 7A to 7C. A waveform in the neighborhood of the spurious frequencies (fsp1, fsp2) illustrated in FIG. 7A, is illustrated in FIG. 7C. A waveform in a low frequency band lower than the spurious frequencies is illustrated FIG. 7B. FIGS. 7B and 7C illustrate a gate signal 300 of the switching FET, a drain voltage 301 of the switching FET, i.e., an input voltage waveform of the piezoelectric transformer, and a drain current 302 of the switching FET.

The piezoelectric transformer is driven at 30% duty in the neighborhood of the spurious frequencies (fsp1, fsp2), and is driven without becoming hard switching with respect to a distorted flyback waveform. Further, the piezoelectric transformer is driven at 50% duty in a lower frequency band than the spurious frequencies, such that a secondary resonance oscillation waveform of resonance frequency of LC will not appear. Therefore, excessive drain current will not flow in the switching FET in a transient state during the power supply starting, and even when the high-voltage is being stably output.

In regard to a time t2 during which the spurious frequencies are passed, the time t2 may be set to a value according to a circuit configuration such as a time constant of the circuit. In particular, as the image forming apparatus, an optimal time is applied for each power supply circuit for high voltage output such as a high voltage for charging, a high voltage for developing, and a high voltage for transfer.

As described above, according to the present exemplary embodiment, in a piezoelectric transformer driving circuit with the configuration in which a sweep operation is performed from the initial frequency to a frequency corresponding to an output voltage, the VCO 110 is controlled for switching the driving duty according to a timing when the driving frequency passes through the spurious frequencies during the high-voltage starting.

More specifically, the piezoelectric transformer is driven by using the pulse with low Duty until the spurious frequencies are passed, and driven by using the pulse with high duty after the spurious frequency are passed. As a result, an influence of voltage fluctuations due to the influence of the spurious frequencies of the piezoelectric transformer can be reduced, and excessive current, which may be generated near the spurious frequencies, can be prevented from flowing in the switching element.

Figure 8:
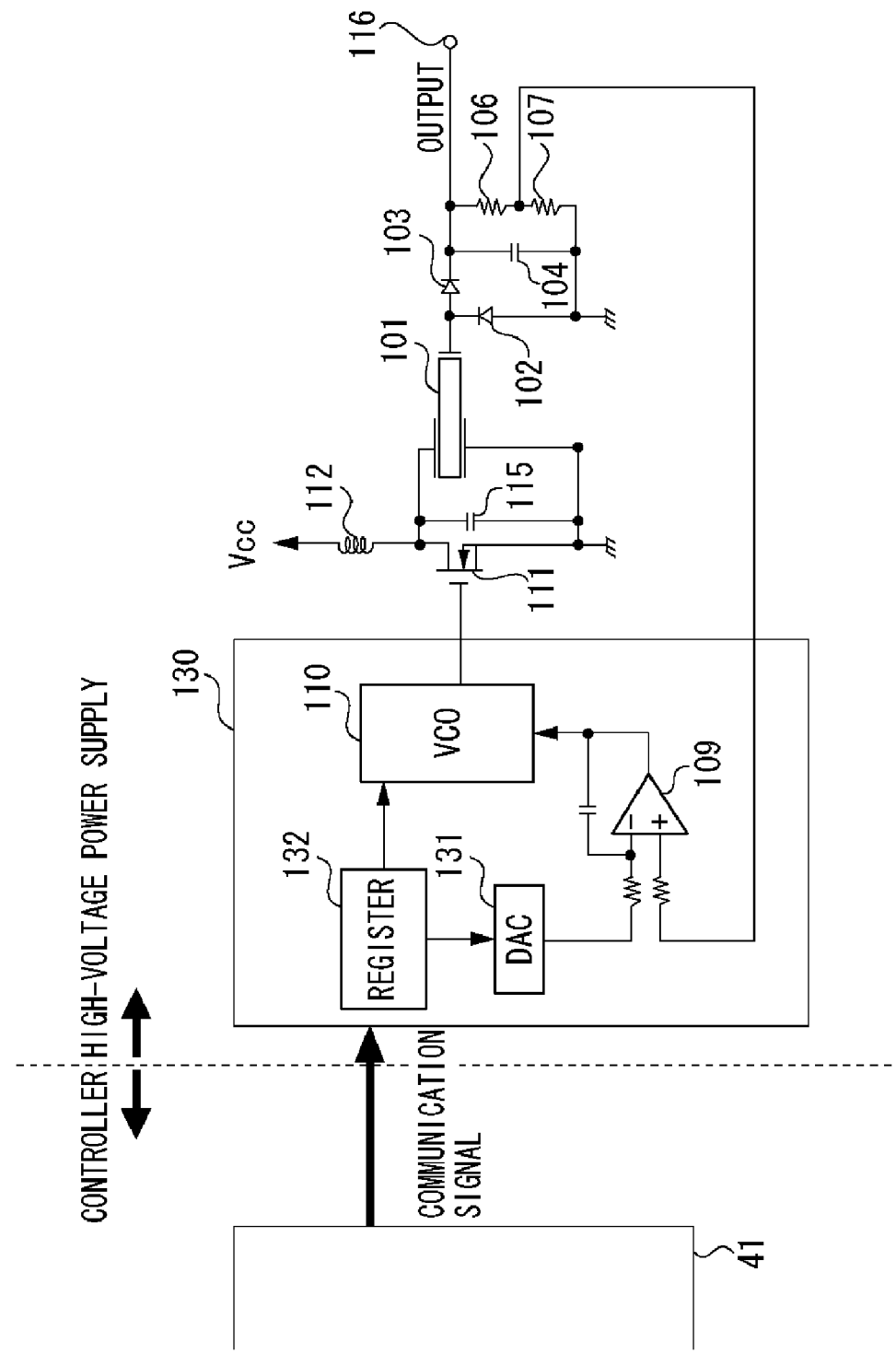
FIG. 8 is a circuit configuration diagram of a high-voltage power supply and a control unit according to a second exemplary embodiment.

Next, a second exemplary embodiment will be described referring to FIG. 8 and FIG. 9. FIG. 8 illustrates a circuit diagram of a high-voltage power supply and a controller unit, which will be described in the present exemplary embodiment. The configuration illustrated in FIG. 8 is different from that of the first exemplary embodiment in that an integrator using an operational amplifier 109 as a main component, a voltage-controlled oscillator (VCO) 110, and a D/A converter unit 131 are integrated in an integrated circuit (IC) 130.

Further, a register 132 is provided in the IC 130 so that data is held in each address according to a communication signal from the MPU 41. Digital data supplied to the D/A converter unit 131, and data for setting the duty of output pulse of a VCO circuit are stored in the register 132, and the data can be rewritten via communications from the MPU 41.

Unlike the first exemplary embodiment, a control for the high-voltage power supply from a control unit 41 is a control via a serial communication, and an output control of the high voltage is an open-loop control in which a feedback is not performed to the control unit 41.

For this reason, erroneous data caused by noises of a communication line or the like may be input, and setting errors may occur in setting of the digital data. In order to avoid the errors, in the firmware (control of program), setting is performed so as to repeatedly execute the communication at a period of 1 millisecond (i.e., to refresh communication data at a period of 1 ms).

Figure 9:
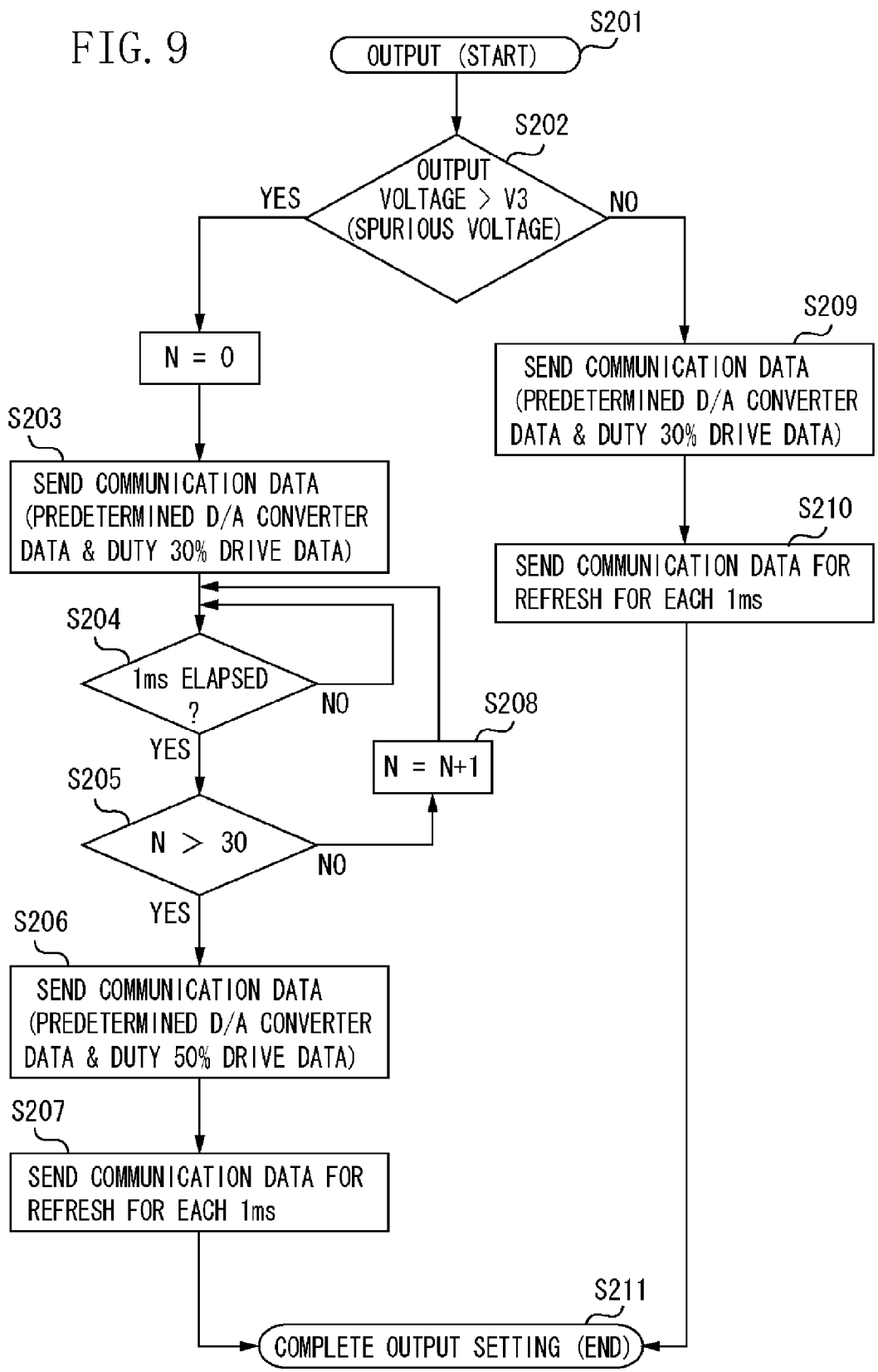
FIG. 9 is a flowchart illustrating a control operation according to the second exemplary embodiment.

FIG. 9 illustrates a control flowchart according to the present exemplary embodiment. The basic configuration of the control is the same as that of the first exemplary embodiment. In the present exemplary embodiment, the firmware refreshes the communication data at each 1 ms.

Operations in steps S201 and S202 are similar to those in the first exemplary embodiment. If the firmware determines that a voltage output in step S202 is greater than the spurious voltage (YES in step S202), then in step S203, the firmware sends drive data at 30% duty and digital data to the D/A converter unit 131 corresponding to a predetermined voltage (target voltage), to perform drive instructions.

The control circuit starts the sweep operation from the timing when digital data corresponding to the predetermined voltage is indicated by the digital data corresponding to the predetermined voltage stored in the register 132. In step S204, the communication data is repeatedly sent at every 1 ms.

In step S205, instruction of the 30% duty drive has been repeatedly performed 30 times, i.e., 30 ms has elapsed from the starting. After that, in step S206, the firmware performs instruction of the 50% duty drive and sending of digital data to the D/A converter unit 131 corresponding to a voltage via the communication.

In step S207, even after the 50% duty drive has been attained, the communication is repeated at each 1 ms. At this time, values of the digital data to the D/A converter unit 131 remain unchanged. Only duty setting data is changed. If it is determined that the voltage output in step S202 from the MPU 41 (firmware) is larger than the spurious voltage (NO in step S202), then, in step S209, the MPU 41 sends 30% duty drive data and digital data corresponding to a predetermined voltage (target voltage) to the D/A converter unit 131 to instruct the driving of the piezoelectric transformer. Then, in step S210, the communication is repeated every 1 ms interval. On the other hand, in S211, the output setting is ended after the processing of step 207 and S210.

In the present exemplary embodiment, after the lapse of 30 ms is assumed, but without being limited thereto, similarly to the first exemplary embodiment, this time period in the sweep operation may be set as appropriate depending on the time period during which the spurious frequencies are passed.

As described above, in the present exemplary embodiment, the drive control unit of the piezoelectric transformer and the controller unit of the image forming apparatus are controlled via the communication, and the communication is performed at a given time period. Then, the firmware sends communication data for switching from a pulse drive with the low duty to a pulse drive with the high duty, after the lapse of number of communication times with consideration of the time during which the spurious frequencies are passed, at the time of the starting of high voltage. As a result, voltage fluctuations due to the influence of the spurious frequencies of the piezoelectric transformer can be reduced, and the excessive current generated near the spurious frequencies can be prevented from flowing in the switching element.

Figure 10:
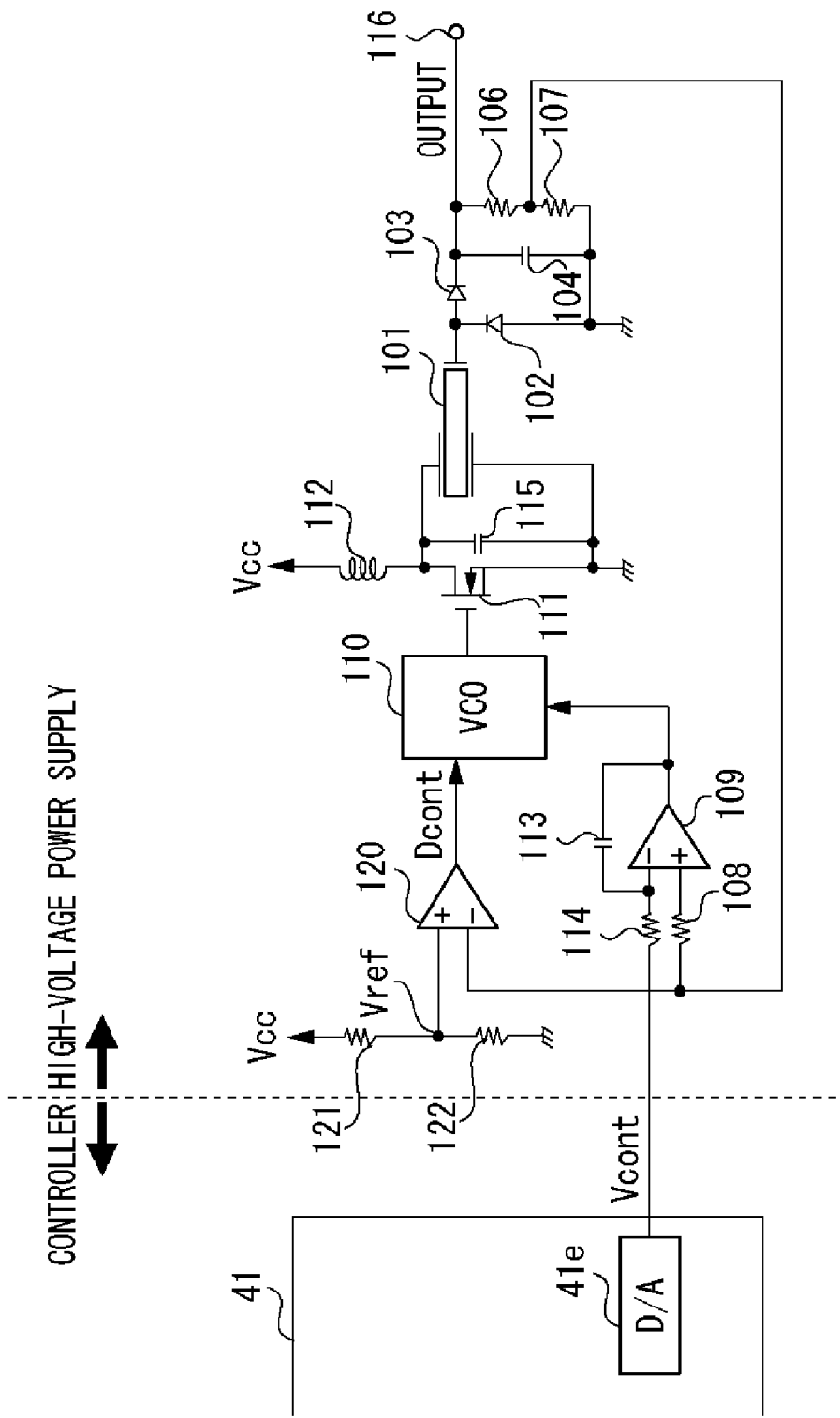
FIG. 10 is a circuit configuration diagram of a high-voltage power supply and a control unit according to a third exemplary embodiment.
Figure 11:
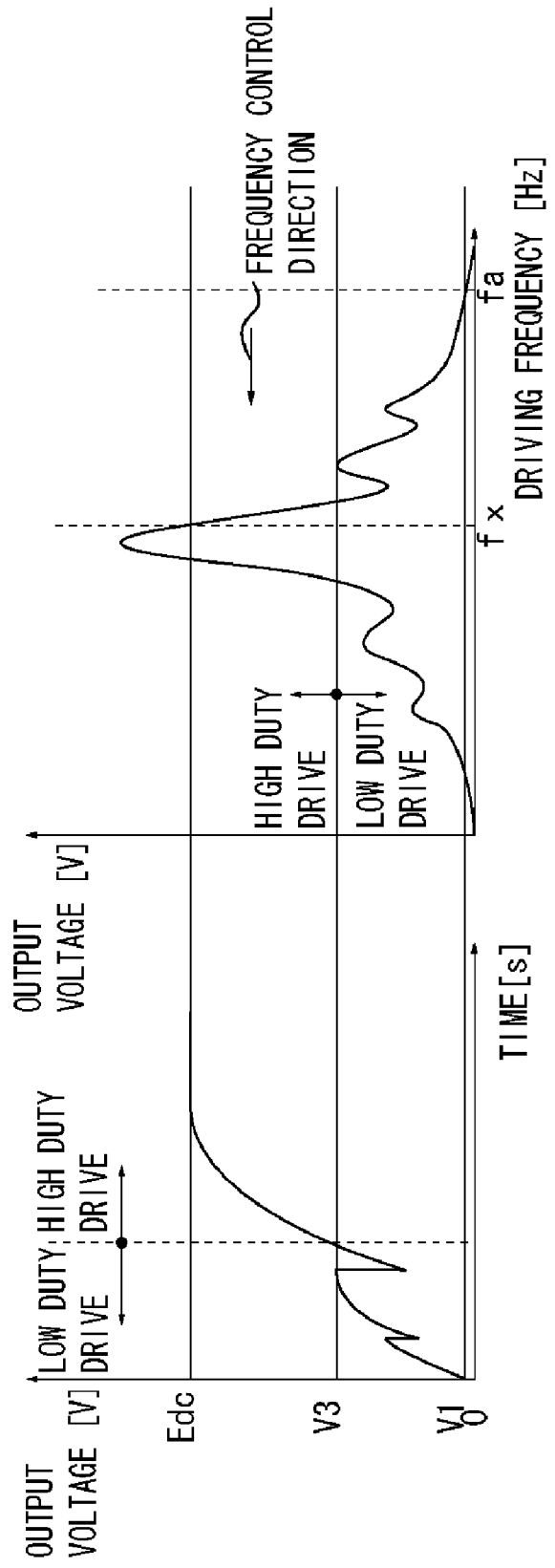
FIGS. 11A and 11B illustrate a starting operation of a piezoelectric transformer according to the third exemplary embodiment.
Figure 12:
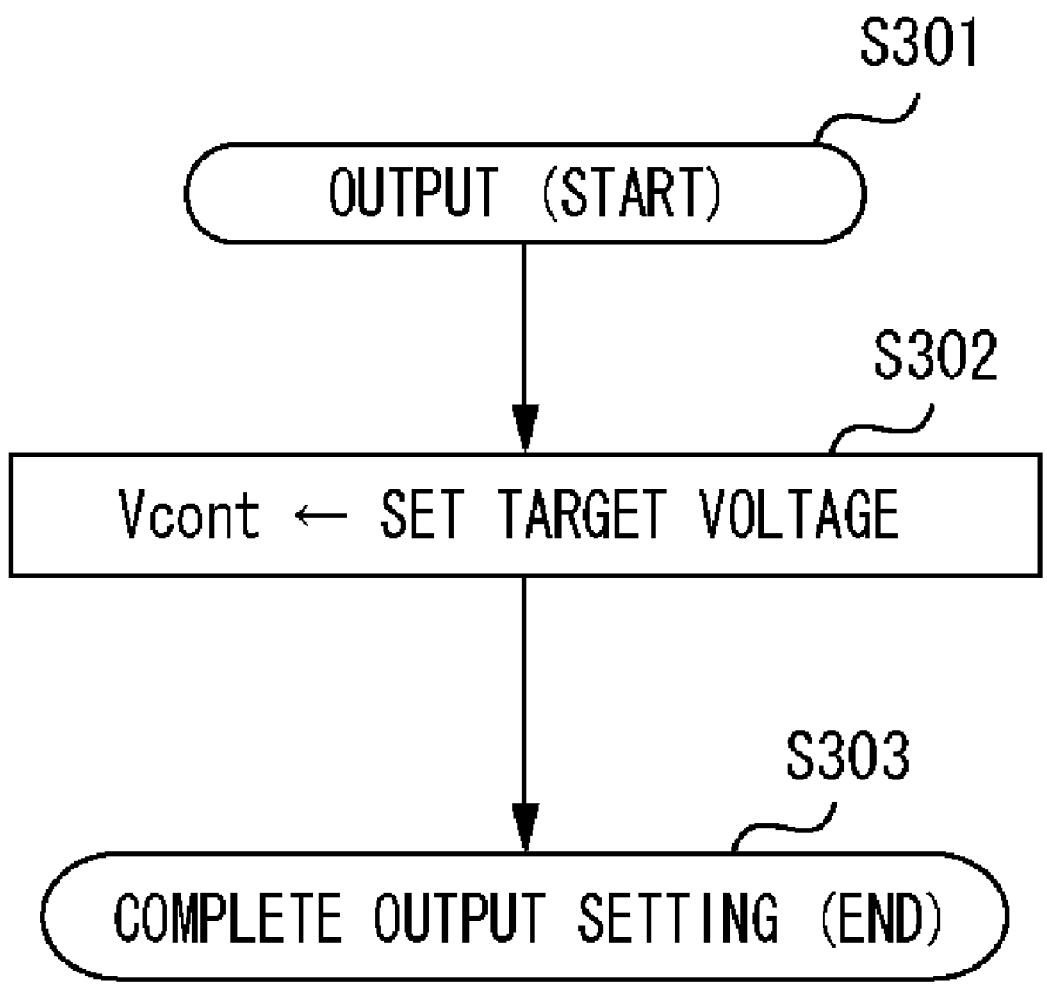
FIG. 12 is a flowchart illustrating a control operation according to the third exemplary embodiment.

Next, a third exemplary embodiment will be described referring to FIG. 10 through FIG. 12. A different point from the first exemplary embodiment is a generation method of a duty switching signal Dcont. In FIG. 10, Vref voltage generated by the resistors 121 and 122 and a feedback voltage of the high-voltage output are input to a comparator 120. An output of the comparator 120 is, as the Dcont signal, input into the VCO 110.

According to the configuration, when an output voltage is lower than the predetermined output-voltage corresponding to Vref, the Dcont signal becomes High Level, and thus the VCO 110 outputs the 30% duty signal. On the other hand, when an output voltage is higher than the predetermined voltage, the Dcont becomes Low Level, and thus the VCO 110 outputs the 50% duty signal.

A maximum value V3 (Refer to FIGS. 11A and 11B) of voltages output at the spurious frequencies is potential-divided by the feedback resistors 106 and 107. A value of the Vref is the divided voltage. As a result, the piezoelectric transformer is driven at the low duty in the neighborhood of the spurious frequencies, and driven at the high duty in a low frequency region apart from the spurious frequencies. Accordingly, excessive current generated near the spurious frequencies of the piezoelectric transformer can be prevented form flowing in the switching element.

A duty switching will be further described with reference to FIGS. 11A and 11B. Hardware performs the sweep operation from the initial frequency fa at which the piezoelectric transformer starts to be driven at the low Duty, towards the target voltage Edc. Since the V3 is set to a voltage equal to or greater than the spurious voltages, the piezoelectric transformer is driven at the low duty at a time point when the spurious frequencies are passed. After the spurious frequencies are passed, the output voltage becomes again equal to or greater than V3, and at the same time the drive is switched to the high duty drive.

In the series of sequences, the firmware is used only to perform setting of the Vcont signal, and a sequential control is not required. In this case, the flowchart is given as illustrated in FIG. 12, where the control can be simpler as compared with that of the first exemplary embodiment and the second exemplary embodiment.

According to the circuit configuration of FIG. 10 described in the present exemplary embodiment, as compared with that of the first exemplary embodiment and the second exemplary embodiment, it is configured such that the duty is automatically switched by the hardware, and there are a merit that I/O output ports of the MPU are saved, and a merit that the starting control by the firmware is simplified.

As described above, according to the present exemplary embodiment, when the firmware performs the sweep operation of frequency from the initial frequency, the present exemplary embodiment has a function that the duty is switched according to the output voltage, i.e., the piezoelectric transformer is driven at the pulse of the low duty in voltages equal to or less than the spurious voltage, and driven at the high duty in voltages greater than spurious voltage. Consequently, an influence of voltage fluctuations caused by the spurious frequencies of the piezoelectric transformer can be reduced, and excessive current generated near the spurious frequencies can be prevented from flowing in the switching element.

Figure 13:
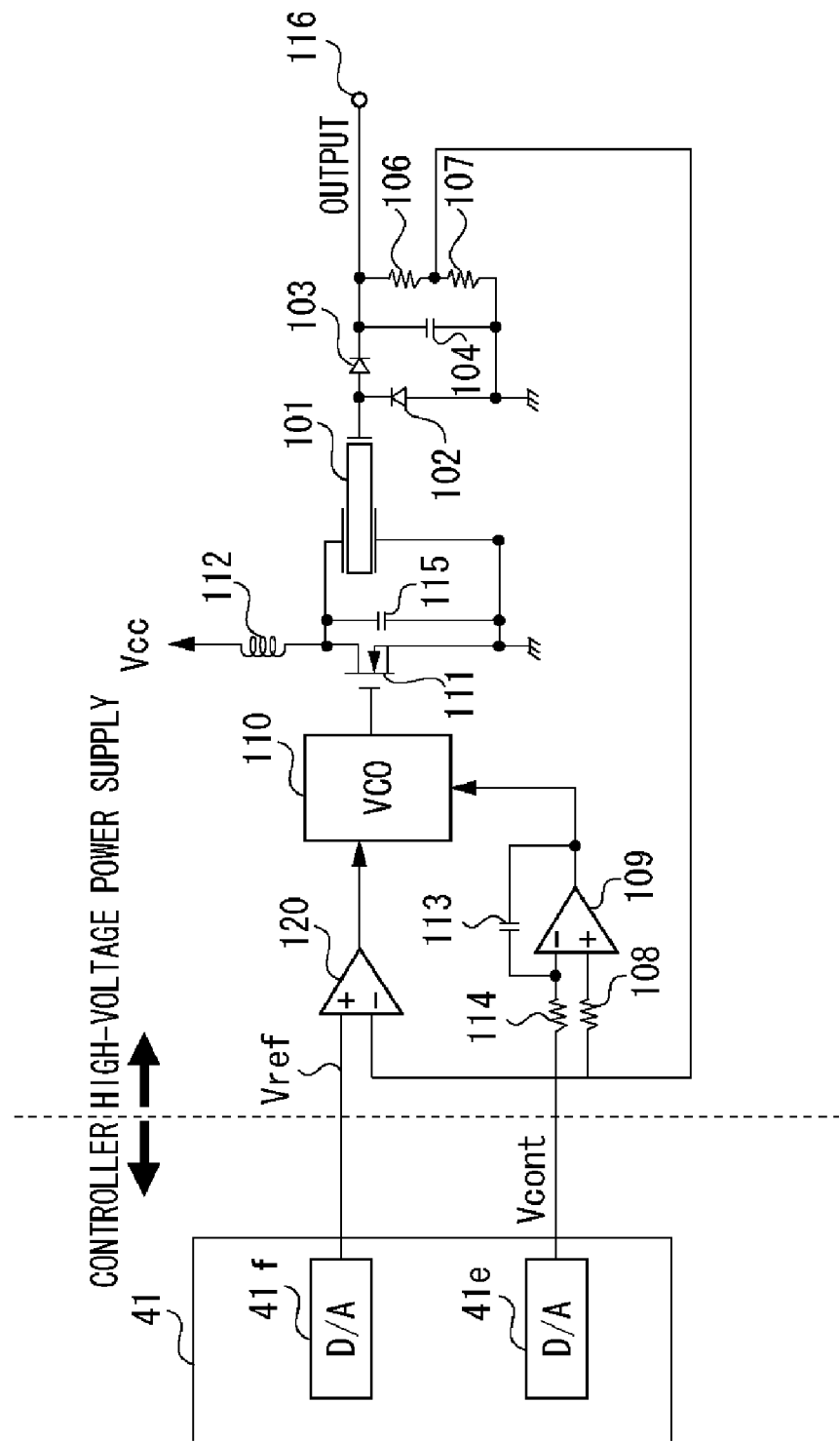
FIG. 13 is a circuit configuration diagram of a high-voltage power supply and a control unit according to a fourth exemplary embodiment.

Next, a fourth exemplary embodiment will be described referring to FIG. 13 and FIG. 14. FIG. 13 illustrates a circuit configuration according to the present exemplary embodiment. The present exemplary embodiment has the same configuration for switching the duty using a voltage as a threshold value similarly to that of the third exemplary embodiment, but it is a different point from the third exemplary embodiment that the Vref is set by the firmware from the MPU 41.

For example, in case of a device configuration in which a resistor value or the like of a load connected to an output unit of high voltage changes significantly due to change over time, a value of the V3 is also changes over time, and the configuration, in which switching by the firmware is possible, is as compared with the third exemplary embodiment.

In this case, output ports of the Vref and the Vcont are D/A ports, but without being limited thereto, for example, a value obtained by integrating Pulse Width Modulation (PWM) signals may be used.

Figure 14:
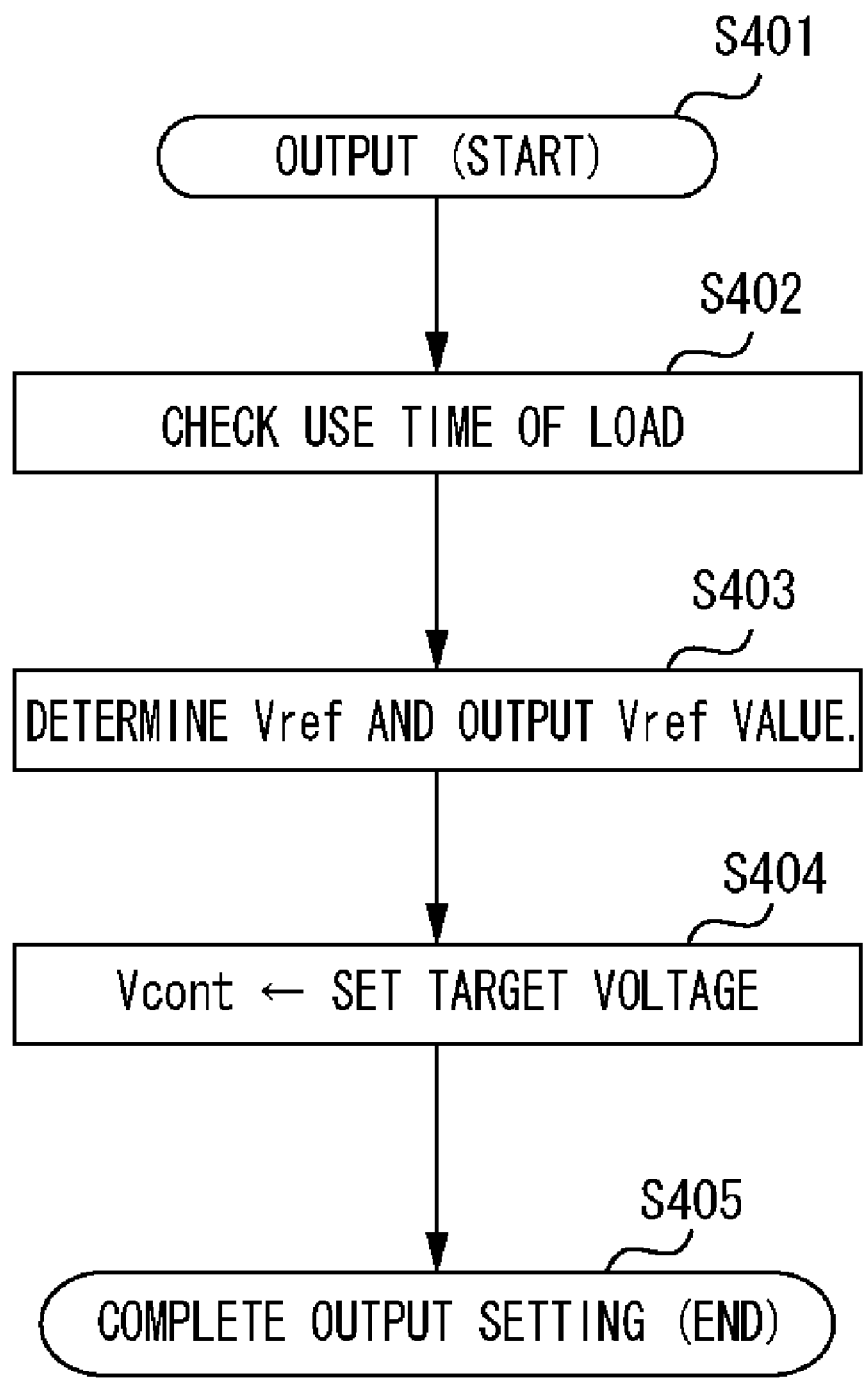
FIG. 14 is a flowchart illustrating a control operation according to the fourth exemplary embodiment.

FIG. 14 is a flowchart according to the present exemplary embodiment. In steps S402 and S403, use time of a load is updated and stored previously in a nonvolatile memory of the device, a set-value of the Vref is changed by determining from the stored use time, which is a different point from the third exemplary embodiment. A sequence for the high-voltage rising after the Vref has been set, is very simple (only an output of the Vcont in step S404), similar to the third exemplary embodiment.

According to the present exemplary embodiment as described above, when the firmware performs the sweep operation of frequency from the initial frequency, the present exemplary embodiment has a function in which the duty is switched according to the output voltage. More specifically, the firmware drives the piezoelectric transformer at a pulse of the low duty in voltages equal to or less than the spurious voltage, and drives at the high duty in voltages greater than the spurious voltage. The high duty drive in the neighborhood of the spurious frequencies is reliably avoided by setting the spurious voltage to a voltage predicted from time-dependent change of a load.

Consequently, voltage fluctuations due to an influence of the spurious frequencies of the piezoelectric transformer can be reduced, and excessive current generated near the spurious frequencies can be prevented from flowing into the switching element.

Figure 15:
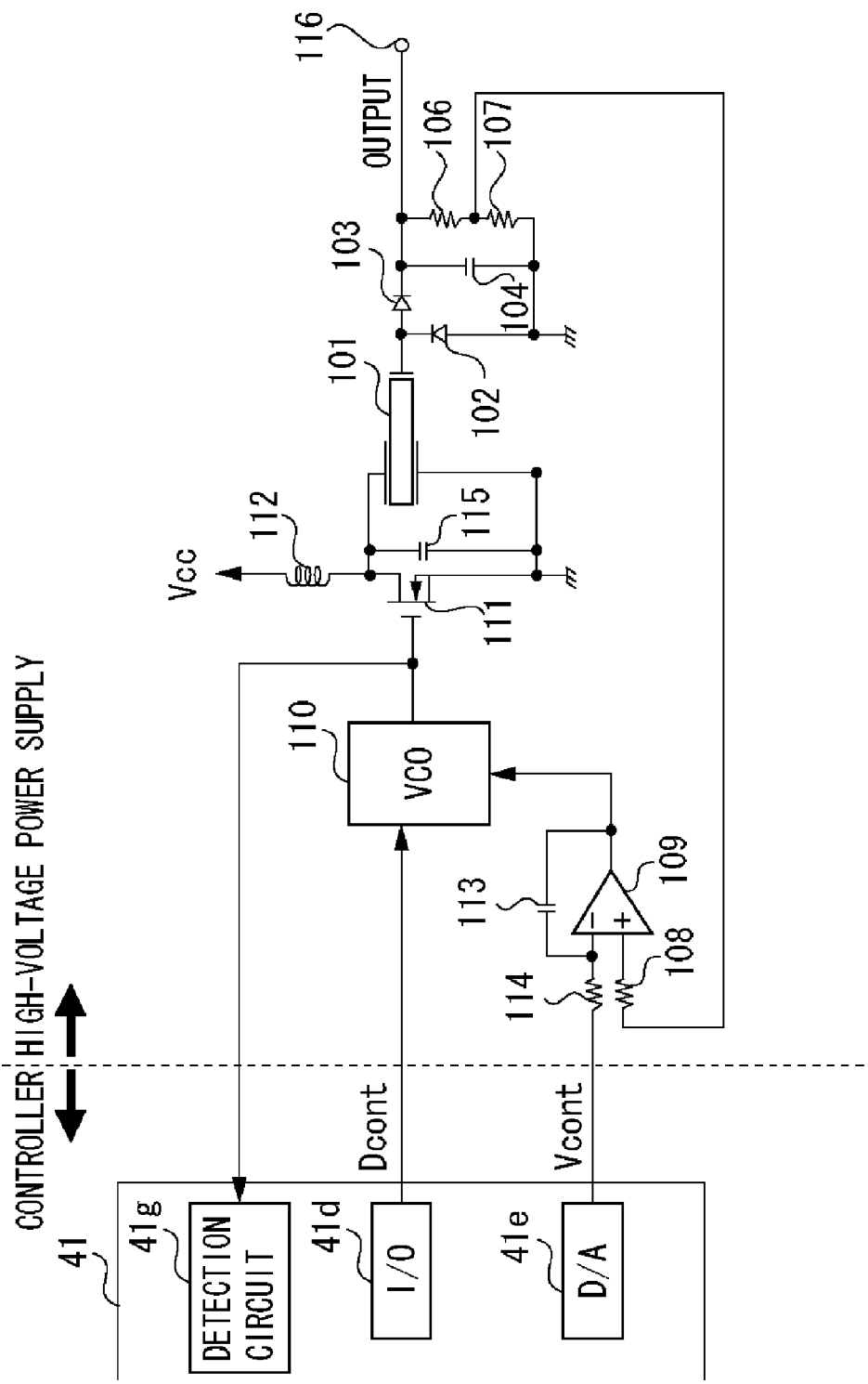
FIG. 15 is a circuit configuration diagram of a high-voltage power supply and a control unit according to a fifth exemplary embodiment.

Next, a fifth exemplary embodiment will be described according to FIG. 15 and FIG. 16. FIG. 15 illustrates a circuit configuration according to the present exemplary embodiment. The present exemplary embodiment is configured such that, comparing with that illustrated in FIG. 2 according to the first exemplary embodiment, a frequency of output signal of the VCO 110 is detected by a frequency detection circuit 41g in the MPU 41. The VCO 110 changes an output signal Dcont output from the I/O port 41d based on the detection result, thereby switching between High Duty and Low Duty.

As a configuration of a frequency detection circuit unit, a configuration for causing a counter to start by an interrupt using a falling edge of a signal as a trigger, causing the counter to stop at the next falling edge, and detecting the period may be conceivable as an example.

In the present exemplary embodiment, it becomes possible to directly detect frequencies, to avoid the spurious frequencies. In the case of the present configuration, since a resolution is dependent upon a clock frequency that drives the MPU 41, the MPU 41 that operates at a high speed clock frequency may be adopted.

Figure 16:
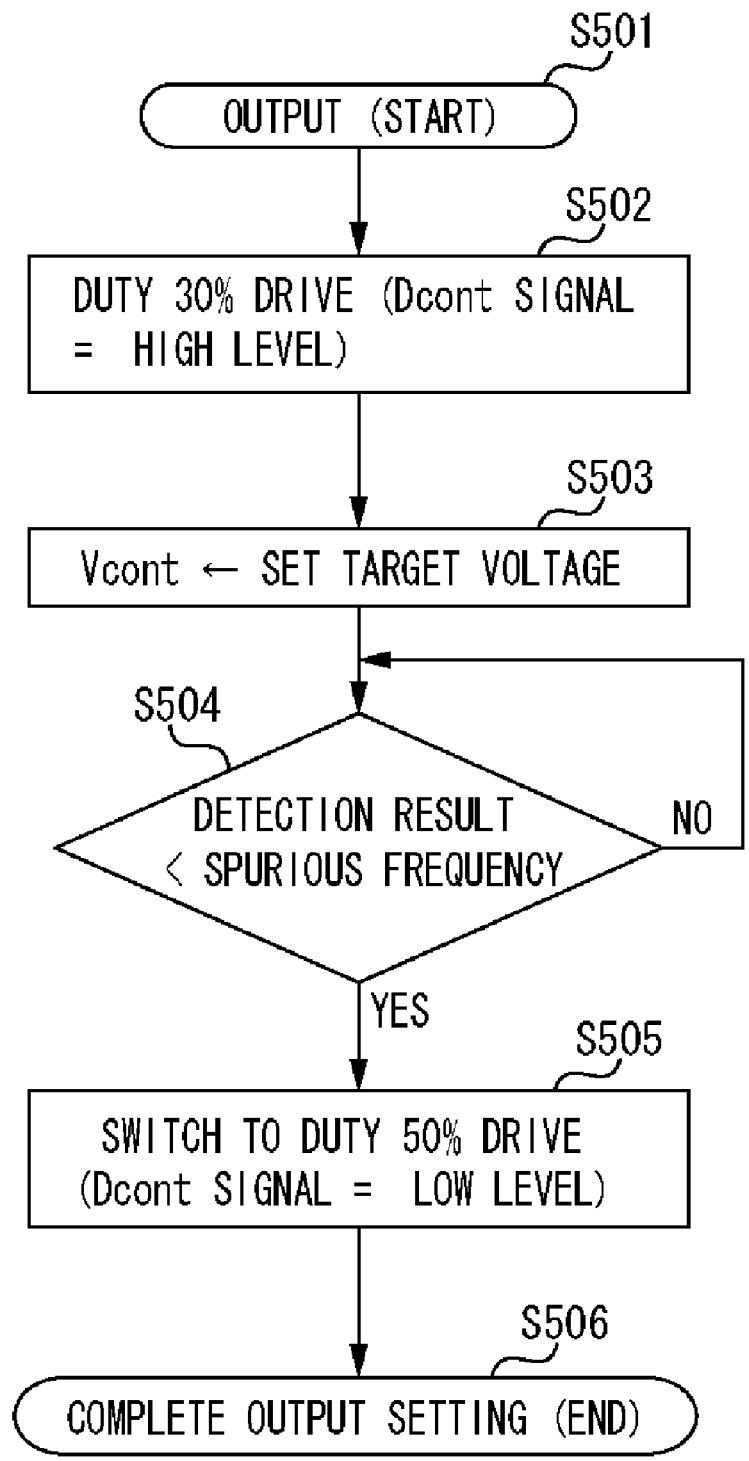
FIG. 16 is a flowchart illustrating a control operation according to the fifth exemplary embodiment.
Figure 17:
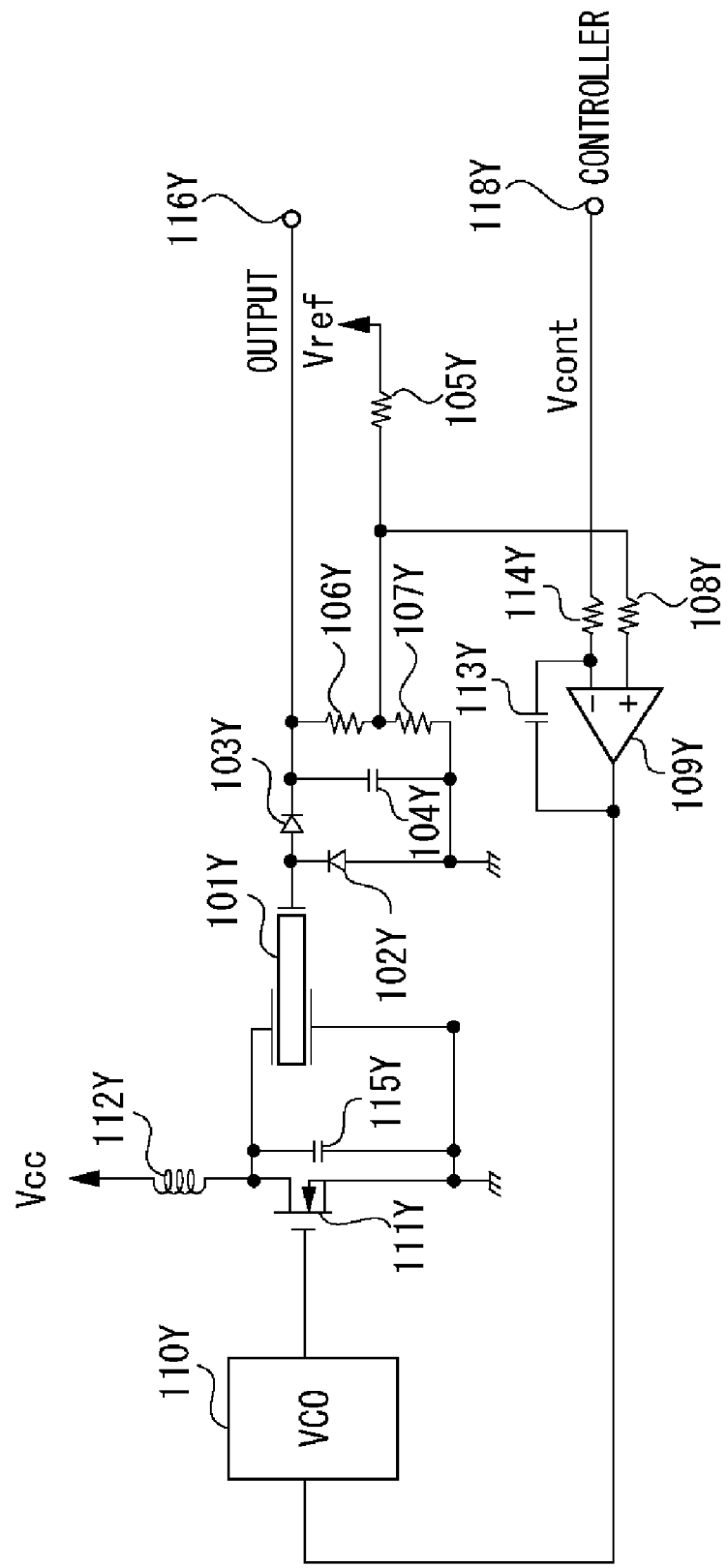
FIG. 17 is a conventional high-voltage power supply circuit diagram.
Figure 18:
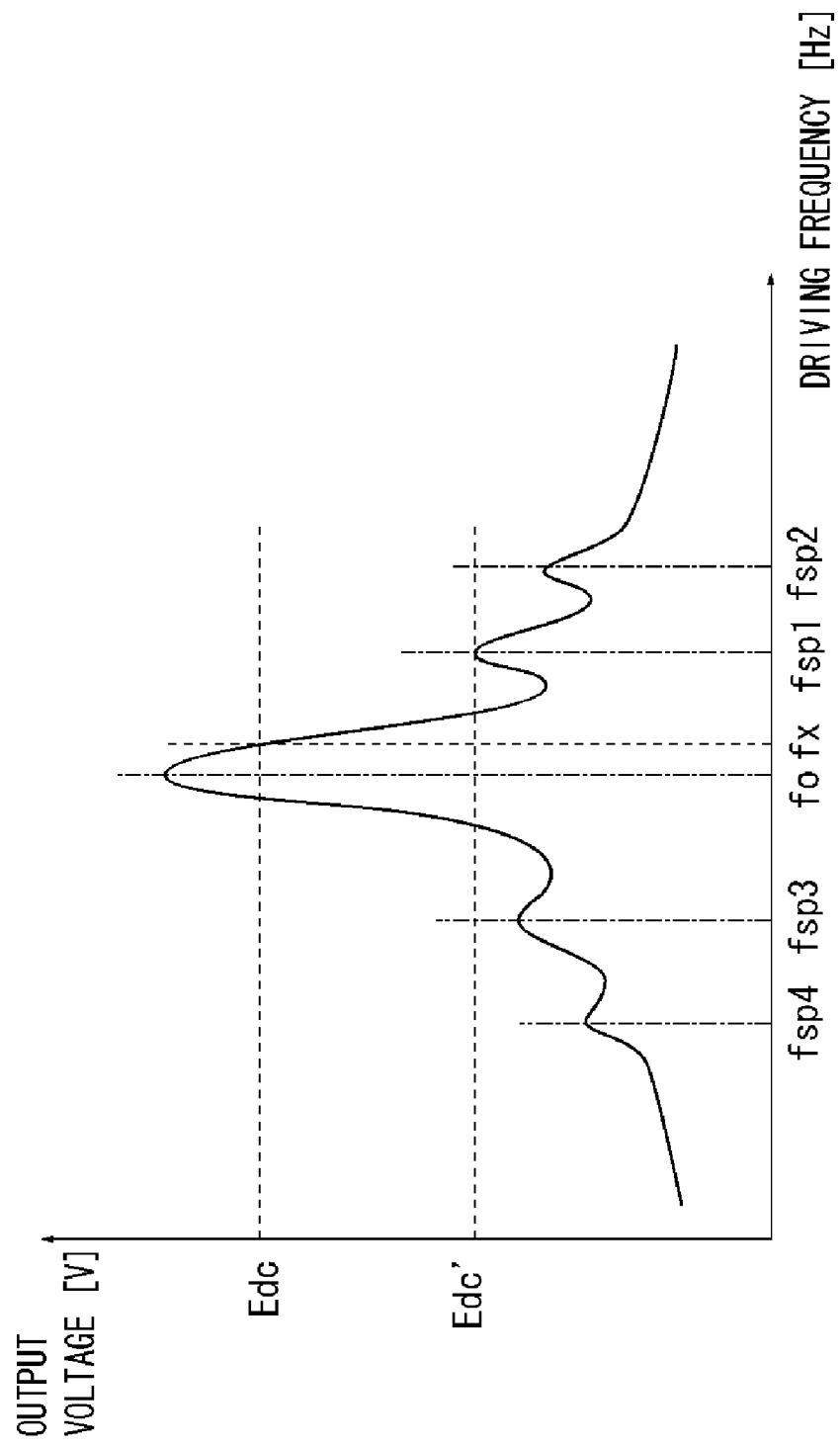
FIG. 18 illustrates a frequency characteristic of a piezoelectric transformer.
Figure 19:
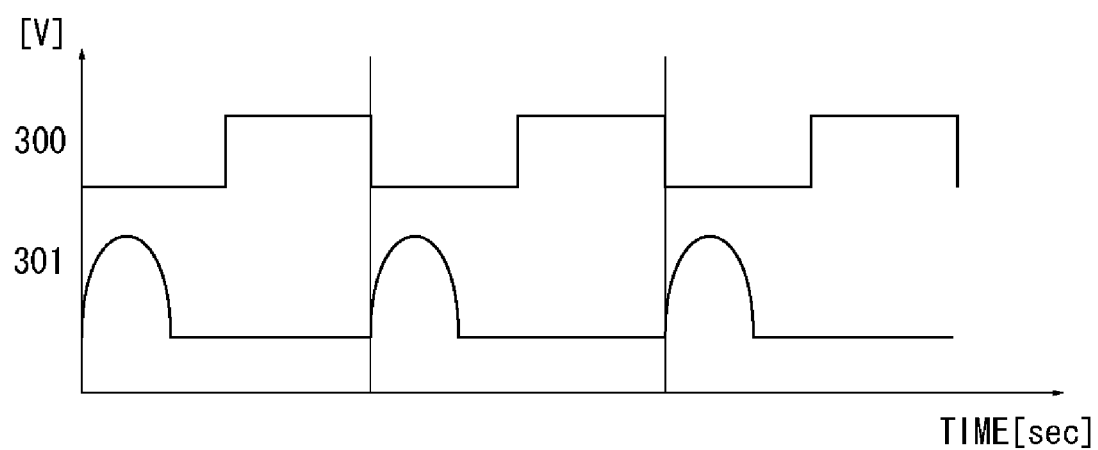
FIG. 19 is a voltage current waveform diagram when a conventional piezoelectric transformer is driven.
Figure 20:
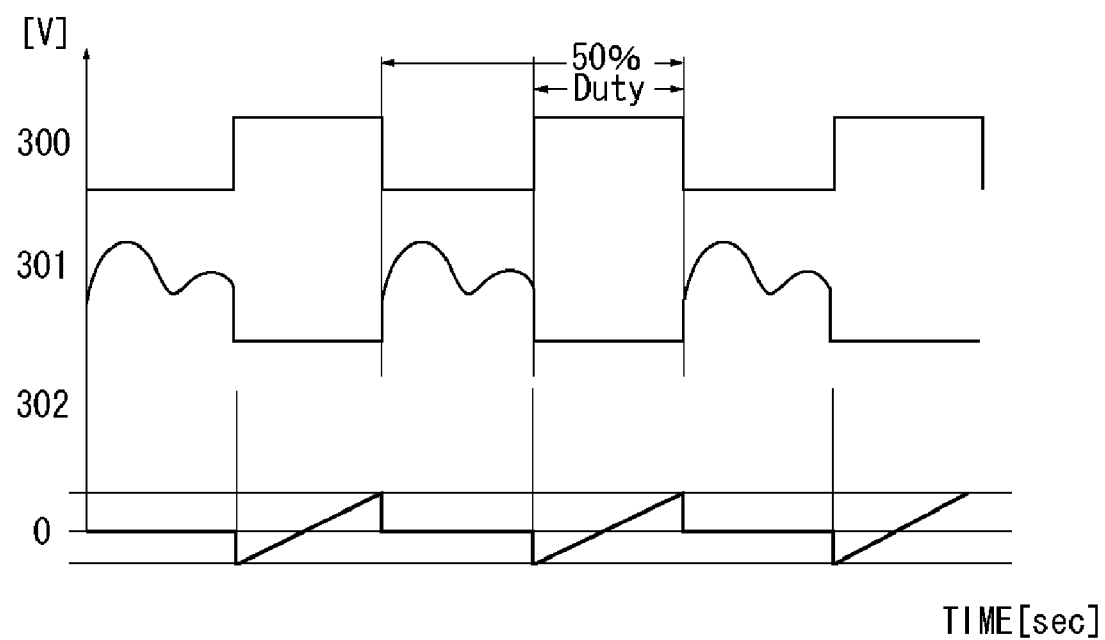
FIG. 20 is an example of a voltage current waveform diagram when a piezoelectric transformer is driven.

FIG. 16 is a flowchart according to the present exemplary embodiment. In steps S501, S502, and S503, a high-voltage rising is started at duty 30%. After that, in step S504, if it is determined that a result detected by the frequency detection unit has become a frequency lower than the spurious frequencies (YES in step S504), then in step S505, the VCO 110 switches to Duty 50%. In step S506, the high-voltage rising sequence is completed.

As described above, according to the present exemplary embodiment, when the sweep operation of the frequency is performed from the initial frequency, the MPU41 has a function for detecting a driving frequency of the VCO 110, which drives the piezoelectric transformer, the MPU41 starts the drive at a pulse of the low Duty, switches to Duty 50% after having detected that a frequency lower than the spurious frequencies is attained in the sweep operation, and then drives the piezoelectric transformer.

Since the present exemplary embodiment can directly detect frequencies, to avoid the spurious frequencies, voltage fluctuations due to an influence of the spurious frequencies of the piezoelectric transformer can be much more reduced, and excessive current generated near the spurious frequencies can be much more prevented from flowing in the switching element, as compared with the first through the fourth exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-333865 filed Dec. 26, 2008, and No. 2009-258191 filed Nov. 11, 2009, which are hereby incorporated by reference herein in their entirety.

What is claimed is:

1. A power supply device including a piezoelectric element, a switching element configured to drive the piezoelectric element, and an oscillation unit configured to output a frequency signal to the switching element, configured to output a high voltage by driving the piezoelectric element at a frequency based on the frequency signal, the power supply device comprising:
a control unit configured to output a control signal to the oscillation unit for controlling the oscillation unit to output the frequency signal; and
a setting unit configured to set a switching-on time period of the switching element driven by the frequency signal,
wherein the setting unit is configured to, in a frequency range from an initial frequency at which drive of the piezoelectric element is started to a driving frequency at which a target voltage is output from the piezoelectric element, set the switching-on time period in a frequency range including an interval during which a spurious resonance frequency is generated from the initial frequency, shorter than the switching-on time period when the piezoelectric element is driven at the driving frequency.

2. The power supply device according to claim 1, wherein the frequency range including the interval during which the undesired resonance frequency is generated, refers to a range until a first time has elapsed since drive of the piezoelectric element is started.

3. The power supply device according to claim 2, wherein the setting unit is configured to set the switching-on time period since the drive of the piezoelectric element is started until the first time has elapsed, to be shorter than the switching-on time period after the first time has elapsed.

4. The power supply device according to claim 1, wherein the setting unit is configured to set the switching-on time period, based on a voltage output from the piezoelectric element.

5. The power supply device according to claim 1, further comprising a detection unit configured to detect a frequency of the frequency signal since the piezoelectric element starts to be driven.

6. The power supply device according to claim 5, wherein the switching-on time period until a frequency detected by the frequency detection unit reaches a predetermined frequency is set shorter than the switching-on time period after the frequency detected by the frequency detection unit has reached the predetermined frequency.

7. The power supply device according to claim 1, wherein the setting unit and the oscillation unit are configured as an integrated circuit, and the control signal is output at a predetermined interval from the control signal output unit to the integrated circuit.

8. An image forming apparatus including a power supply that includes a piezoelectric element, a switching unit configured to drive the piezoelectric element, and an oscillation unit configured to output a frequency signal to the switching unit, configured to output a high voltage by driving the piezoelectric element at a frequency based on the frequency signal, the image forming apparatus comprising:
a forming unit configured to form an image;
a control unit configured to control an operation of the forming unit, to control the frequency signal, by outputting a control signal to the oscillation unit; and
a setting unit configured to set a switching-on time period of a switching unit driven by the frequency signal,
wherein the setting unit is configured to set, in a frequency range from an initial frequency when drive of the piezoelectric element is started to a driving frequency when a target voltage is output from the piezoelectric element, the switching-on time period in a frequency range including an interval from the initial frequency until a spurious resonance frequency is generated, shorter than the switching-on time period when the piezoelectric element is driven by the driving frequency.

9. The image forming apparatus according to claim 8, wherein the image forming unit includes a charging unit configured to charge an image bearing member, a developing unit configured to develop a latent image formed on the image bearing member, a transfer unit configured to transfer an image developed on the image bearing member by the developing unit.

10. A device including a piezoelectric element, a switching element configured to drive the piezoelectric element, and an oscillation unit configured to output a frequency signal to the switching element, configured to output a high voltage by driving the piezoelectric element at a frequency based on the frequency signal, the device comprising:
a control unit configured to output a control signal to the oscillation unit for controlling the oscillation unit to output the frequency signal; and
a setting unit configured to set a switching-on time period of the switching element driven by the frequency signal,
wherein the setting unit is configured to set the switching-on time period in a frequency range including an interval during which a spurious resonance frequency is generated from an initial frequency, shorter than the switching-on time period when the piezoelectric element is driven at a driving frequency.

11. The device according to claim 8, wherein the setting unit is set in a frequency range from the initial frequency at which drive of the piezoelectric element is started to the driving frequency at which a target voltage is output from the piezoelectric element.

12. The device according to claim 11, wherein the frequency range including the interval during which the undesired resonance frequency is generated, refers to a range until a first time has elapsed since drive of the piezoelectric element is started.

13. The device according to claim 12, wherein the setting unit is configured to set the switching-on time period since the drive of the piezoelectric element is started until the first time has elapsed, to be shorter than the switching-on time period after the first time has elapsed.

14. The device according to claim 11, wherein the setting unit is configured to set the switching-on time period, based on a voltage output from the piezoelectric element.

15. The device according to claim 11, further comprising a detection unit configured to detect a frequency of the frequency signal since the piezoelectric element starts to be driven.

16. The device according to claim 15, wherein the switching-on time period until a frequency detected by the frequency detection unit reaches a predetermined frequency is set shorter than the switching-on time period after the frequency detected by the frequency detection unit has reached the predetermined frequency.

17. The device according to claim 11, wherein the setting unit and the oscillation unit are configured as an integrated circuit, and the control signal is output at a predetermined interval from the control signal output unit to the integrated circuit.

18. A method comprising:
   driving a piezoelectric element by a switching unit;
   outputting a frequency signal to the switching unit by an oscillation unit;
   outputting a high voltage by driving the piezoelectric element at a frequency based on the frequency signal;
   outputting a control signal to the oscillation unit for controlling the oscillation unit to output the frequency signal; and
   setting a switching-on time period of a switching unit driven by the frequency signal by a setting unit,
   wherein the setting unit is configured to set the switching-on time period in a frequency range including an interval during which a spurious resonance frequency is generated from an initial frequency, shorter than the switching-on time period when the piezoelectric element is driven at a driving frequency.

19. The method according to claim 18, wherein the setting unit is set in a frequency range from the initial frequency at which drive of the piezoelectric element is started to the driving frequency at which a target voltage is output from the piezoelectric element.

20. The method according to claim 18, wherein the frequency range including the interval during which the undesired resonance frequency is generated, refers to a range until a first time has elapsed since drive of the piezoelectric element is started.

* * * * *